US009549185B2

(12) United States Patent
Lee

(10) Patent No.: US 9,549,185 B2
(45) Date of Patent: *Jan. 17, 2017

(54) METHOD AND APPARATUS FOR HIERARCHICAL DATA UNIT-BASED VIDEO ENCODING AND DECODING COMPRISING QUANTIZATION PARAMETER PREDICTION

(71) Applicant: SAMSUNG ELECTRONICS CO., LTD., Suwon-si (KR)

(72) Inventor: Tammy Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/924,948

(22) Filed: Oct. 28, 2015

(65) Prior Publication Data

US 2016/0050414 A1    Feb. 18, 2016

Related U.S. Application Data

(63) Continuation of application No. 14/446,479, filed as application No. PCT/KR2013/000776 on Jan. 30, 2013.

(Continued)

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/176* (2014.11); *H04N 19/463* (2014.11); *H04N 19/61* (2014.11)

(58) Field of Classification Search
CPC .... H04N 19/124; H04N 19/61; H04N 19/463; H04N 19/176
See application file for complete search history.

(56) References Cited

U.S. PATENT DOCUMENTS 7,263,125 B2 * 8/2007 Lainema ............... H04N 19/70
375/240.04
7,792,193 B2   9/2010 Tanizawa et al.
(Continued)

FOREIGN PATENT DOCUMENTS

CN    1835595 A    9/2006
CN  101233757 A    7/2008
(Continued)

OTHER PUBLICATIONS

Bross, B. "WD5: Working Draft 5 of High-Efficiency Video Coding", Joint Collaborative Team on Video Coding (JCT-VC) ofITU-T SG16 WP3 and ISO/IEC JTC1/SC29/WG11, Nov. 21-30, 2011, Geneva, CH.*

(Continued)

*Primary Examiner* — Sath V Perungavoor
*Assistant Examiner* — Philip Dang
(74) *Attorney, Agent, or Firm* — Sughrue Mion, PLLC

(57) ABSTRACT

A method of decoding a video includes determining an initial value of a quantization parameter (QP) used to perform inverse quantization on coding units included in a slice segment, based on syntax obtained from a bitstream; determining a slice-level initial QP for predicting the QP used to perform inverse quantization on the coding units included in the slice segment, based on the initial value of the QP; and determining a predicted QP of a first quantization group of a parallel-decodable data unit included in the slice segment, based on the slice-level initial QP.

2 Claims, 21 Drawing Sheets

Related U.S. Application Data

(60) Provisional application No. 61/592,577, filed on Jan. 30, 2012.

(51) Int. Cl.
*H04N 19/61* (2014.01)
*H04N 19/463* (2014.01)

(56) References Cited

U.S. PATENT DOCUMENTS

| | | | |
|---|---|---|---|
| 2007/0025441 A1 | 2/2007 | Ugur et al. | |
| 2009/0067738 A1* | 3/2009 | Fuchie | H04N 19/176 382/251 |
| 2010/0086028 A1* | 4/2010 | Tanizawa | H04N 19/176 375/240.12 |
| 2010/0177820 A1 | 7/2010 | Chono et al. | |
| 2010/0322317 A1* | 12/2010 | Yoshimatsu | H04N 19/70 375/240.24 |
| 2011/0150077 A1* | 6/2011 | Kishore | H04N 19/176 375/240.03 |
| 2011/0274162 A1 | 11/2011 | Zhou et al. | |
| 2013/0077871 A1 | 3/2013 | Lu et al. | |
| 2013/0083845 A1* | 4/2013 | Yu | H04N 19/197 375/240.03 |
| 2013/0101031 A1* | 4/2013 | Van der Auwera | H04N 19/14 375/240.12 |
| 2013/0287103 A1* | 10/2013 | Seregin | H04N 19/70 375/240.12 |
| 2013/0330012 A1* | 12/2013 | Sato | H04N 19/61 382/233 |

FOREIGN PATENT DOCUMENTS

| | | |
|---|---|---|
| JP | 2000-224589 A | 8/2000 |
| KR | 10-2008-0031344 A | 4/2008 |
| KR | 10-2009-0025538 A | 3/2009 |
| KR | 10-2011-0071204 A | 6/2011 |
| WO | 2009/031648 A1 | 3/2009 |
| WO | 2011/140211 A2 | 11/2011 |
| WO | WO 2011/140211 A2 * | 11/2011 |
| WO | 2011/156458 A1 | 12/2011 |
| WO | WO 2011/156458 AI * | 12/2011 |

OTHER PUBLICATIONS

ITU-T, "Series H: Audiovisual and Mul Ti Media Systems Infrastructure of audiovisual services—Coding of moving video—High efficiency video coding" Apr. 2013.*
Communication dated Dec. 4, 2015, issued by the Canadian Intellectual Property Office in Canadian Application No. 2,863,390.
Woo-Shik Kim, Region-of-Interest Coding using Sub-Picture Slice Structure, Journal of Broadcast Engineering, vol. 7, No. 4, 2002, pp. 335-344, Cited in ISR and Written Opinion both issued in PCT/KR2013/000776; May 9, 2013.
International Search Report issued on May 9, 2013 by the International Searching Authority in related Application No. PCT/KR2013/000776.
Written Opinion issued on May 9, 2013 by the International Searching Authority in related Application No. PCT/KR2013/000776.
Communication dated Feb. 9, 2015, issued by the Australian Patent Office in counterpart Australian Application No. 2013215773.
Communication dated Apr. 28, 2015, issued by the Intellectual Property Office of Mexico in counterpart Mexican Application No. MX/a/2014/009176.
Communication dated Jun. 8, 2015, issued by the European Patent Office in counterpart European Application No. 13744207.5.
Lee T et al., "CE4 Subtest 4.1: Higher granularity of quantization parameter scaling". 99. MPEG Meeting; Jun. 2, 2012-Oct. 2, 2012; San Josa CR ; (Motion Picture Expert Group or ISO/IEC JTC1/SC29/WG11),, No. m23211, Jan. 20, 2012, Total 6 pages, XP030051736, Cited in comm. issued on Jun. 8, 2015 in 13744207.5.
Coban M et al., "On entropy slices", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,,No. JCTVC-HO515, Jan. 21, 2012, Total 6 pages, XP030111542, Cited in comm. issued on Jun. 8, 2015 in 13744207.5.
Hirofumi Aoki et al., "Prediction-based QP derivation", Mar. 10, 2011, No. JCTVC-E215, Mar. 10, 2011, Total 11 pages, XP030008721, Cited in comm. issued on Jun. 8, 2015 in 13744207.5.
Communication issued on Sep. 29, 2015 by the Japanese Patent Office in related Application No. 2014-554670.
Fuldseth et al., "Tiles", Joint Collaborative Team on Video Coding (JCT-VC) of ITU-T SG16 WP3 and ISO/IEC JCT1/SC29/WG11, 6th Meeting, Jul. 14-22, 2011, 19 total pages, retrieved from <URL:http://phenix.it-sudparis.eudct/doc_end_user/documents/6_Torino/wg11/JCTVC-F335-v2.zip> Cited in comm. issued on Sep. 29, 2015 in 2014-554670.
Anonymous, "High efficiency encoding of ubiquitous technology video-MPEG-4 and H.264", 1st Edition, Apr. 20, 2005, 14 total pages, Partial Translation; cited in comm. issued on Sep. 29, 2015 in 2014-554670.
Clare et al., "Wavefront Parallel Processing for HEVC Encoding and Decoding", Joint Collaborative Team on Video Coding (JCT-VC) of ITU-T SG16 WP3 and ISO/IEC JTC1/SC29/WG11, 6th Meeting, Jul. 14-22, 2011, 20 total pages, retrieved from <Url:http://phenix.it-sudparis.eu/jct/doc_end_user/documents/6_Torino/wg11/JCTVC-F274-v2.zip>, Cited in comm. issued on Sep. 29, 2015 in 2014-554670.
Communication dated May 17, 2016 issued by the Taiwanese Patent Office in counterpart Taiwanese Patent Application No. 102103567.
Communication dated Nov. 15, 2016, issued by the State Intellectual Property Office of P.R. China in counterpart Chinese application No. 201380007361.2.

* cited by examiner

FIG. 7
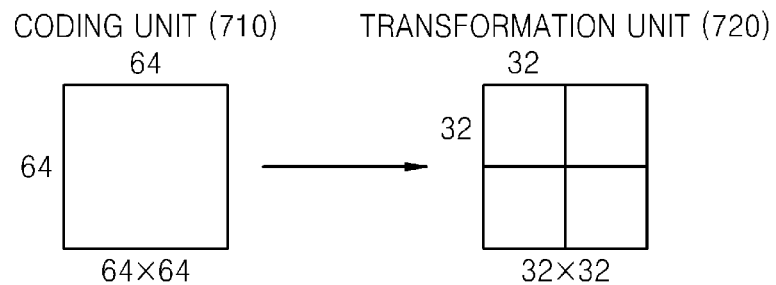
FIG. 8
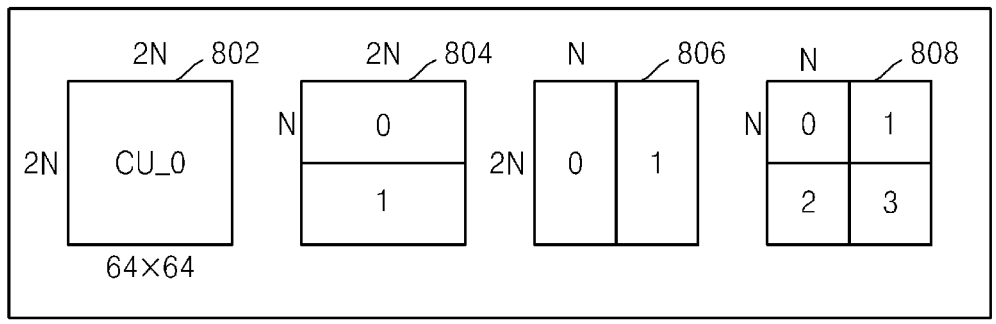
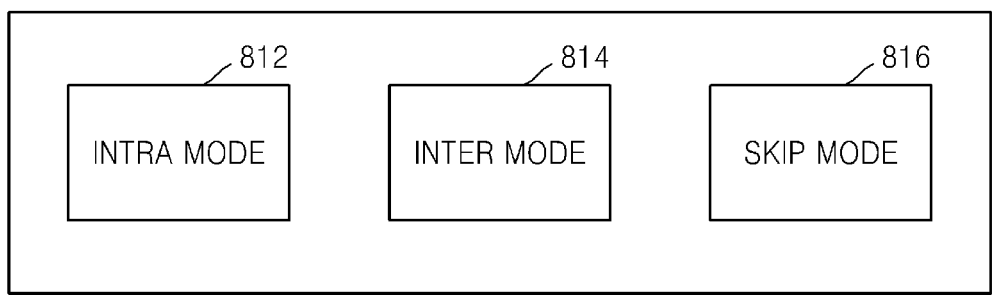
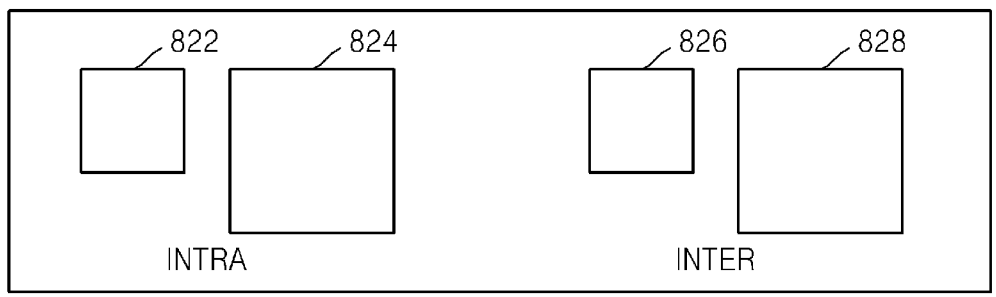

CODING UNIT (1010)

FIG. 22

| pic_parameter_set_rbsp( ) { | Descriptor |
|---|---|
| ...... | |
| | |
| pic_init_qp_minus26 | se(v) |
| ...... | |
| | |
| cu_qp_delta_enabled_flag | u(1) |
| if ( cu_qp_delta_enabled_flag ) | |
|    diff_cu_qp_delta_depth | ue(v) |
| ...... | |
| dependent_slice_segments_enabled_flag | u(1) |
| tiles_enabled_flag | u(1) |
| entropy_coding_sync_enabled_flag | u(1) |
| ......} | |

2210 — pic_init_qp_minus26
2220 — cu_qp_delta_enabled_flag
2230 — diff_cu_qp_delta_depth
2240 — entropy_coding_sync_enabled_flag

FIG. 23

| slice_segment_header( ) { | Descriptor |
|---|---|
| ...... | |
| | |
|    slice_qp_delta | se(v) |
| ...... | |
| } | |

2310 — slice_qp_delta

FIG. 24

| transform_unit( x0, y0, xBase, yBase, log2TrafoSize, trafoDepth, blkIdx ) { | Descriptor |
|---|---|
| ........ | |
| cu_qp_delta_abs | ae(v) |
| ........ | |
| cu_qp_delta_abs | ae(v) |
| ........ | |
| } | |

2410 — cu_qp_delta_abs (first)
2420 — cu_qp_delta_abs (second)

METHOD AND APPARATUS FOR HIERARCHICAL DATA UNIT-BASED VIDEO ENCODING AND DECODING COMPRISING QUANTIZATION PARAMETER PREDICTION

CROSS-REFERENCE TO RELATED PATENT APPLICATION

This application is a continuation application of U.S. patent application Ser. No. 14/446,479, filed on Jul. 30, 2014, which claims the benefits of a continuation application of International Application No. PCT/KR2013/000776, filed on Jan. 30, 2013, and claims the benefit of U.S. Provisional Application No. 61/592,577, filed on Jan. 30, 2012, in the U.S. Patent and Trademark Office, the disclosures of which are incorporated herein by reference in their entireties.

BACKGROUND

1. Field

Methods and apparatuses consistent with exemplary embodiments relate to video encoding and decoding.

2. Description of Related Art

In general, according to video compression standards, such as Moving Picture Expert Group (MPEG) and H.26X, a bitstream is generated by compressing image data through prediction, transformation, quantization, and entropy encoding processes.

In the prediction process, a prediction image of image data to be encoded is generated by performing intra prediction using spatial correlations of images, or inter prediction using temporal correlations of images.

In the transformation process, an error data, which is a difference between an original image and the prediction image generated in the prediction process, is transformed to the transformation domain by using various transformation methods. Representative transformation methods include discrete cosine transformation (DCT) and wavelet transformation.

In the quantization process, transformation coefficients generated in the transformation process are appropriately loss-compressed according to the error value and the size of a target bitstream. Most standard image and video codecs based on lossy compression perform quantization and inverse quantization processes according to a quantization step. In the quantization process, a quantized value is obtained by dividing an input value by the quantization step and then rounding off the divided value to an integer. Due to the quantization process, information is loss-compressed. Because all lossy compression technologies include a quantization process, original data may not be perfectly restored but a compression rate may be increased.

SUMMARY

Exemplary embodiments of the present application provide a solution for improving a process of predicting a quantization parameter (QP) used to perform quantization or inverse quantization in order to process video data in parallel.

According to aspects of the exemplary embodiments, a predicted quantization parameter (QP) of a first quantization group of a parallel-processable data unit is obtained by using a slice-level initial QP.

According to an aspect of an exemplary embodiment, there is provided a method of decoding a video, the method including determining an initial value of a quantization parameter (QP) used to perform inverse quantization on coding units included in a slice segment, based on syntax obtained from a bitstream; determining a slice-level initial QP for predicting the QP used to perform inverse quantization on the coding units included in the slice segment, based on the initial value of the QP; determining a predicted QP of a first quantization group of a parallel-decodable data unit included in the slice segment, based on the slice-level initial QP; determining a QP to be applied to the first quantization group based on the predicted QP; and performing inverse quantization on a coding unit included in the first quantization group, based on the determined QP.

According to another aspect of an exemplary embodiment, there is provided an apparatus for decoding a video, the apparatus including an entropy decoder configured to determine an initial value of a quantization parameter (QP) used to perform inverse quantization on coding units included in a slice segment, based on syntax obtained from a bitstream; and an inverse quantizer configured to determine a slice-level initial QP for predicting the QP used to perform inverse quantization on the coding units included in the slice segment, based on the initial value of the QP, determine a predicted QP of a first quantization group of a parallel-decodable data unit included in the slice segment, based on the slice-level initial QP, determine a QP to be applied to the first quantization group based on the obtained predicted QP, and perform inverse quantization on a coding unit included in the first quantization group, based on the determined QP.

According to another aspect of an exemplary embodiment, there is provided a method of encoding a video, the method including obtaining a quantization parameter (QP) used to perform quantization on coding units included in a slice segment; determining a slice-level initial QP for predicting a QP of a first quantization group of a parallel-decodable data unit included in the slice segment; determining a predicted QP of the first quantization group based on the determined slice-level initial QP; and generating a bitstream including syntax information indicating the determined slice-level initial QP.

According to another aspect of an exemplary embodiment, there is provided an apparatus for encoding a video, the apparatus including a quantizer configured to perform quantization on coding units included in a slice segment, determine a slice-level initial quantization parameter (QP) for predicting a QP of a first quantization group of a parallel-decodable data unit included in the slice segment, obtain a predicted QP of the first quantization group based on the determined slice-level initial QP, and output a difference between a QP used to perform quantization on a coding unit included in the first quantization group and the predicted QP, and the determined slice-level initial QP; and an entropy encoder configured to generate a bitstream comprising syntax information indicating the determined slice-level initial QP.

According to aspects of the exemplary embodiments, a predicted quantization parameter (QP) of an initially quantized or inversely quantized data unit may be obtained based on encoding information of an upper data unit regardless of a processing order of coding units, and thus a bottleneck problem in which processing of a data unit is delayed until another data unit is completely processed according to a processing order of data units may be solved in a quantization or inverse quantization process.

BRIEF DESCRIPTION OF THE DRAWINGS

The above and other aspects will become more apparent by describing in detail exemplary embodiments thereof with reference to the attached drawings in which:

FIG. 7 is a diagram for describing a relationship between a coding unit and transformation units (TUs), according to an exemplary embodiment;

FIG. 8 is a diagram for describing encoding information of coding units corresponding to a coded depth, according to an exemplary embodiment;

FIG. 22 is a table showing QP-related syntax provided to a picture parameter set (PPS), according to an exemplary embodiment;

FIG. 23 is a table showing QP-related syntax provided to a slice segment header, according to an exemplary embodiment;

FIG. 24 is a table showing QP-related syntax added into transformation unit information, according to an exemplary embodiment;

DETAILED DESCRIPTION OF EXEMPLARY EMBODIMENTS

Hereinafter, the exemplary embodiments will be described in detail with reference to the attached drawings.

Figure 1:
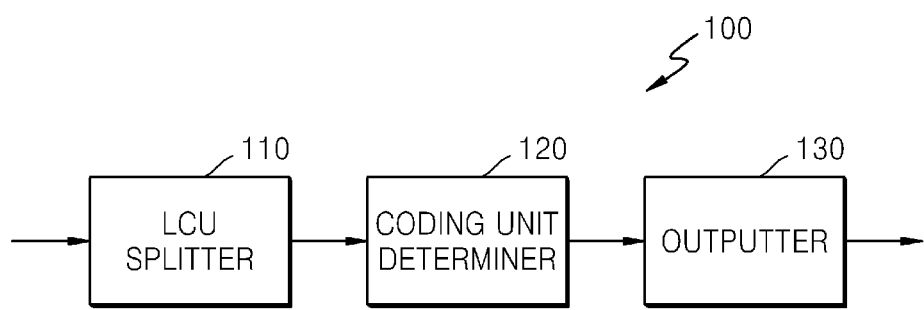
FIG. 1 is a block diagram of an apparatus for encoding a video, according to an exemplary embodiment.

FIG. 1 is a block diagram of a video encoding apparatus 100 according to an exemplary embodiment.

The video encoding apparatus 100 includes a largest coding unit (LCU) splitter 110, a coding unit determiner 120, and an outputter 130.

The LCU splitter 110 may split a current picture of an image based on an LCU, which is a coding unit of a maximum size. If the current picture is larger than the LCU, image data of the current picture may be split into at least one LCU. The LCU may be a data unit having a size of 32×32, 64×64, 128×128, 256×256, etc., wherein a shape of the data unit is a square which has a width and length of $2^n$ and is greater than 8. The image data may be output to the coding unit determiner 120 according to each LCU.

A coding unit may be characterized by a maximum size and a depth. The depth denotes the number of times the coding unit is spatially split from the LCU, and as the depth deepens, deeper coding units according to depths may be split from the LCU to a smallest coding unit. A depth of the LCU is an uppermost depth and a depth of the smallest coding unit is a lowermost depth. Because a size of a coding unit corresponding to each depth decreases as the depth of the LCU deepens, a coding unit corresponding to an upper depth may include a plurality of coding units corresponding to lower depths.

As described above, image data of the current picture is split into the LCUs according to a maximum size of the coding unit, and each of the LCUs may include deeper coding units that are split according to depths. Because the LCU is split according to depths, the image data of a spatial domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output finally encoded image data according to the at least one split region. In other words, the coding unit determiner 120 determines a coded depth by encoding the image data in the deeper coding units according to depths, according to the LCU of the current picture, and selecting a depth having the smallest encoding error. The determined coded depth and the encoded image data according to LCUs are output to the outputter 130.

The image data in the LCU is encoded based on the deeper coding units corresponding to at least one depth equal to or smaller than the maximum depth, and results of encoding the image data are compared based on each of the deeper coding units. A depth having the smallest encoding error may be selected after comparing encoding errors of the deeper coding units. At least one coded depth may be selected for each LCU.

The size of the LCU is split as a coding unit is hierarchically split according to depths and as the number of coding units increases. Also, even if coding units correspond to a same depth in one LCU, it is determined whether to split each of the coding units corresponding to the same depth to a lower depth by measuring an encoding error of the image data of each coding unit, separately. Accordingly, even when image data is included in one LCU, the image data is split into regions according to the depths, and the encoding errors may differ according to regions in the one LCU, and thus the coded depths may differ according to regions in the image data. Thus, one or more coded depths may be determined in one LCU, and the image data of the LCU may be divided according to coding units of at least one coded depth.

Accordingly, the coding unit determiner 120 may determine coding units having a tree structure included in the LCU. The 'coding units having a tree structure' include coding units corresponding to a depth determined to be the coded depth, from among all deeper coding units included in the LCU. A coding unit having a coded depth may be hierarchically determined according to depths in the same region of the LCU, and may be independently determined in different regions. Similarly, a coded depth in a current region may be independently determined from a coded depth in another region.

A maximum depth is an index related to the number of times splitting is performed from an LCU to a smallest coding unit. A first maximum depth may denote the total number of times splitting is performed from the LCU to the smallest coding unit. A second maximum depth may denote the total number of depth levels from the LCU to the smallest coding unit. For example, when a depth of the LCU is 0, a depth of a coding unit, in which the LCU is split once, may be set to 1, and a depth of a coding unit, in which the LCU is split twice, may be set to 2. Here, if the smallest coding unit is a coding unit in which the LCU is split four times, five depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Because the number of deeper coding units increases whenever the LCU is split according to depths, encoding including the prediction encoding and the transformation is performed on all of the deeper coding units generated as the depth deepens. For convenience of description, the prediction encoding and the transformation will now be described based on a coding unit of a current depth, in an LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having the smallest encoding error.

The video encoding apparatus 100 may also perform the transformation on the image data in a coding unit based on, not only the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit (TU)'. Similar to the coding unit, the TU in the coding unit may be recursively split into smaller sized regions, so that the TU may be independently determined in units of regions. Thus, residual data in the coding unit may be divided according to the TU having the tree structure according to transformation depths.

A transformation depth indicating the number of times splitting is performed to reach the TU by splitting the height and width of the coding unit may also be set in the TU. For example, in a current coding unit of 2N×2N, a transformation depth may be 0 when the size of a TU is 2N×2N, may be 1 when the size of a TU is N×N, and may be 2 when the size of a TU is N/2×N/2. That is, the TU having the tree structure may also be set according to transformation depths.

Encoding information according to coding units corresponding to a coded depth requires, not only information about the coded depth, but also information related to prediction encoding and transformation. Accordingly, the coding unit determiner 120 determines, not only a coded depth having the smallest encoding error, but also determines a partition type in a prediction unit, a prediction mode according to prediction units, and a size of a TU for transformation.

Coding units according to a tree structure in an LCU and a method of determining a partition, according to exemplary embodiments, will be described in detail below with reference to FIGS. 3 through 12.

The coding unit determiner 120 may measure an encoding error of deeper coding units according to depths by using Rate-Distortion Optimization based on Lagrangian multipliers.

The outputter 130 outputs the image data of the LCU, which is encoded based on the at least one coded depth determined by the coding unit determiner 120, and information about the encoding mode according to the coded depth, in bit streams.

The encoded image data may be a coding result of residual data of an image.

The information about the encoding mode according to the coded depth may include information about the coded depth, information about the partition type in the prediction unit, prediction mode information, and size information of the TU.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Because at least one coding unit of the lower depth exists in one coding unit of the current depth, the encoding is repeatedly performed on each coding unit of the lower depth, and thus the encoding may be recursively performed for the coding units having the same depth.

Because the coding units having a tree structure are determined for one LCU, and information about at least one encoding mode is determined for a coding unit of a coded depth, information about at least one encoding mode may be determined for one LCU. Also, a coded depth of the image data of the LCU may be different according to locations because the image data is hierarchically split according to depths, and thus information about the coded depth and the encoding mode may be set for the image data.

Accordingly, the outputter 130 may assign encoding information about a corresponding coded depth and an encoding mode to at least one of the coding unit, the prediction unit, and a minimum unit included in the LCU.

The minimum unit is a square-shaped data unit obtained by splitting the smallest coding unit constituting the lowermost depth by 4. Alternatively, the minimum unit may be a maximum square-shaped data unit that may be included in all of the coding units, prediction units, partition units, and TUs included in the LCU.

For example, the encoding information output through the outputter 130 may be classified into encoding information according to coding units and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bit stream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of four coding units of the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, because encoding may be performed on each LCU by using any one of various prediction modes and transformations, an optimum encoding mode may be determined considering characteristics of the coding unit of various image sizes.

Thus, if an image having a high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased because a coding unit is adjusted while considering characteristics of an image while increasing a maximum size of a coding unit while considering a size of the image.

Figure 2:
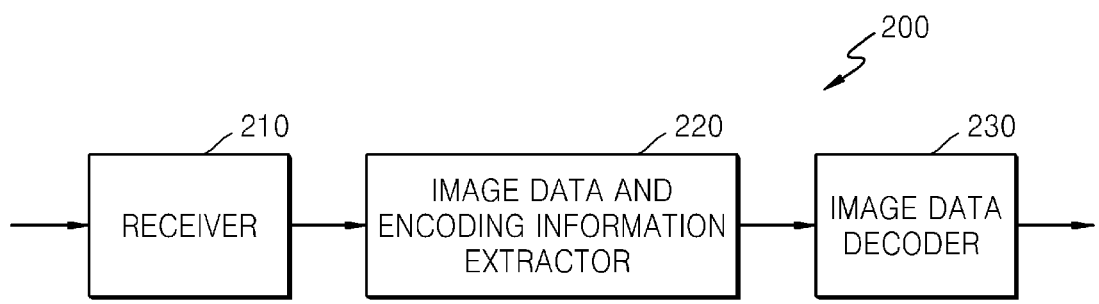
FIG. 2 is a block diagram of an apparatus for decoding a video, according to an exemplary embodiment.

FIG. 2 is a block diagram of a video decoding apparatus 200 according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit (TU), and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about an LCU of a current picture, from a header of the current picture.

Also, the image data and encoding information extractor 220 extracts information about a coded depth and an encoding mode for the coding units having a tree structure according to each LCU, from the parsed bitstream. The extracted information about the coded depth and the encoding mode is output to the image data decoder 230. In more detail, the image data in a bit stream may be split into the LCU so that the image data decoder 230 may decode the image data for each LCU.

The information about the coded depth and the encoding mode according to the LCU may be set for information about at least one coding unit corresponding to the coded depth, and information about an encoding mode may include information about a partition type of a corresponding coding unit corresponding to the coded depth, about a prediction mode, and a size of a TU. Also, splitting information according to depths may be extracted as the information about the coded depth.

The information about the coded depth and the encoding mode according to each LCU extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each LCU. Accordingly, the video decoding apparatus 200 may restore an image by decoding the image data according to a coded depth and an encoding mode that generates the minimum encoding error.

Because encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same LCU.

The image data decoder 230 restores the current picture by decoding the image data in each LCU based on the information about the coded depth and the encoding mode according to the LCUs. In other words, the image data decoder 230 may decode the encoded image data based on the extracted information about the partition type, the prediction mode, and the TU for each coding unit from among the coding units having the tree structure included in each LCU. A decoding process may include prediction, including intra prediction, and motion compensation, and inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each TU in the coding unit, based on the information about the size of the TU of the coding unit according to coded depths, to perform the inverse transformation according to LCUs.

The image data decoder 230 may determine at least one coded depth of a current LCU by using split information according to depths. If the split information indicates that image data is no longer split in the current depth, the current depth is a coded depth. Accordingly, the image data decoder 230 may decode the coding unit of the current depth with respect to the image data of the current LCU by using the information about the partition type of the prediction unit, the prediction mode, and the size of the TU.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each LCU, and may use the information to decode the current picture. In other words, encoded image data of the coding units having the tree structure determined to be the optimum coding units in each LCU may be decoded.

Accordingly, even if image data has a high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a TU, according to an exemplary embodiment, will now be described with reference to FIGS. 3 through 13.

Figure 3:
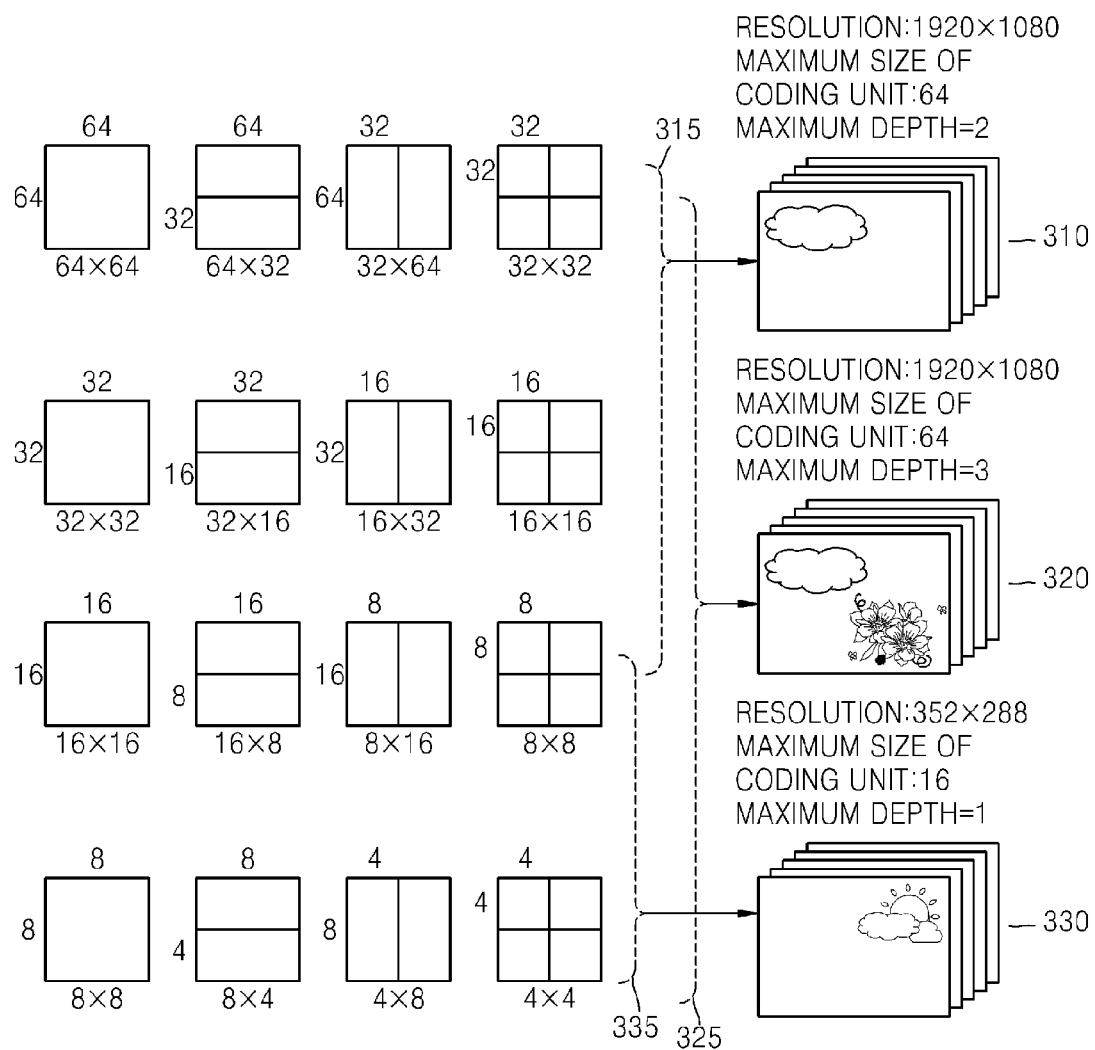
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32; and a coding unit of 32×32 may be split into partitions of 32×32, 32×16, 16×32, or 16×16; a coding unit of 16×16 may be split into partitions of 16×16, 16×8, 8×16, or 8×8; and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from an LCU to a smallest coding unit.

If a resolution is high or a data amount is large, a maximum size of a coding unit may be large, so as to not only increase encoding efficiency but also to accurately reflect characteristics of an image. Accordingly, the maximum size of the coding unit of the video data 310 and 320 having the higher resolution than the video data 330 may be 64.

Because the maximum depth of the video data 310 is 2, coding units 315 of the vide data 310 may include an LCU having a long axis size of 64, and coding units having long axis sizes of 32 and 16 because depths are deepened to two layers by splitting the LCU twice. Meanwhile, because the maximum depth of the video data 330 is 1, coding units 335 of the video data 330 may include an LCU having a long axis size of 16, and coding units having a long axis size of 8 because depths are deepened to one layer by splitting the LCU once.

Because the maximum depth of the video data 320 is 3, coding units 325 of the video data 320 may include an LCU having a long axis size of 64, and coding units having long axis sizes of 32, 16, and 8 because the depths are deepened to 3 layers by splitting the LCU three times. As a depth deepens, detailed information may be precisely expressed.

Figure 4:
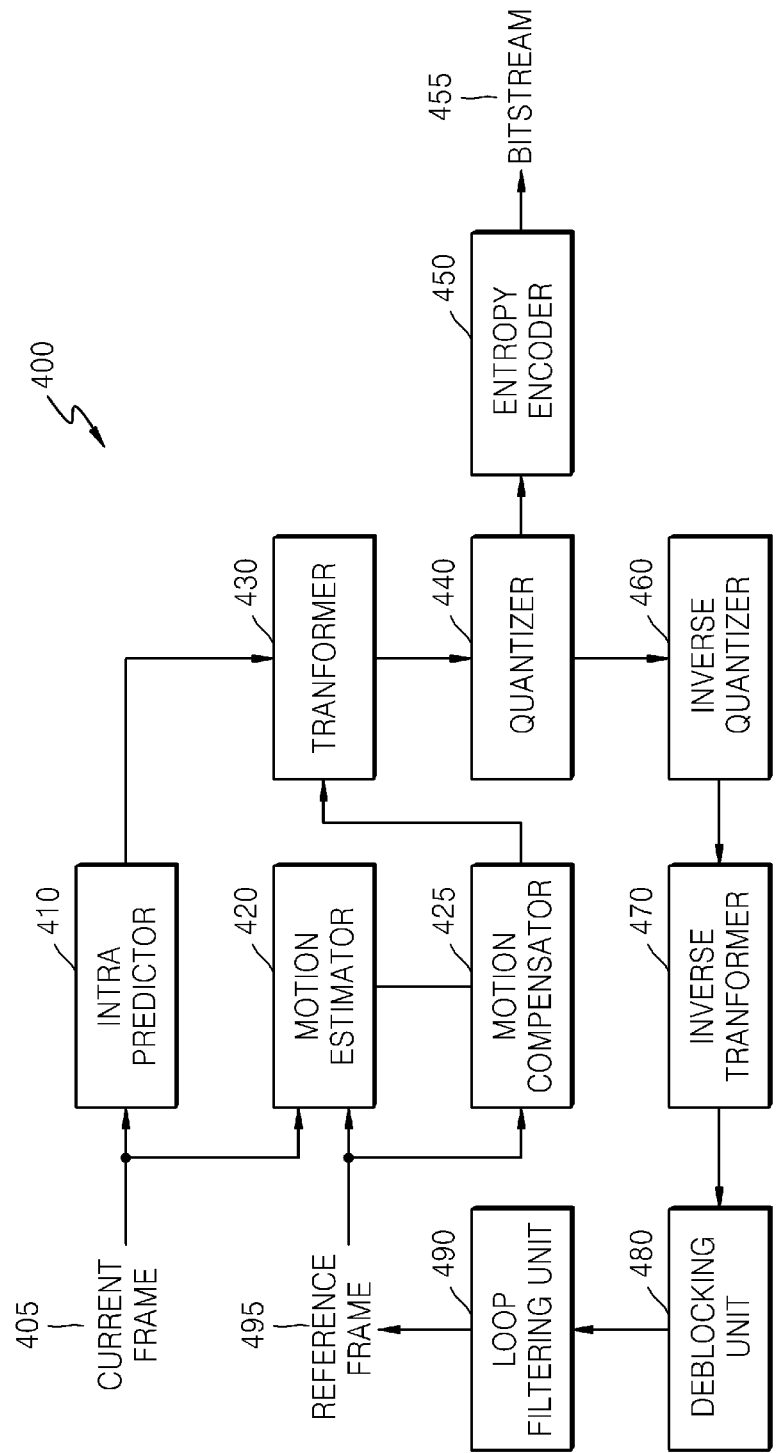
FIG. 4 is a block diagram of an image encoder based on coding units, according to an exemplary embodiment.

FIG. 4 is a block diagram of an image encoder 400 based on coding units, according to an exemplary embodiment.

The image encoder 400 performs operations performed when the coding unit determiner 120 of the video encoding apparatus 100 encodes image data. In more detail, an intra predictor 410 performs intra prediction on coding units in an intra mode, with respect to a current frame 405, and a motion estimator 420 and a motion compensator 425 respectively perform inter estimation and motion compensation on coding units in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each LCU.

Specifically, the intra predictor 410, the motion estimator 420, and the motion compensator 425 should determine partitions and a prediction mode of each coding unit from among the coding units having a tree structure while considering the maximum size and the maximum depth of a current LCU, and the transformer 430 determines the size of the TU in each coding unit from among the coding units having a tree structure.

Figure 5:
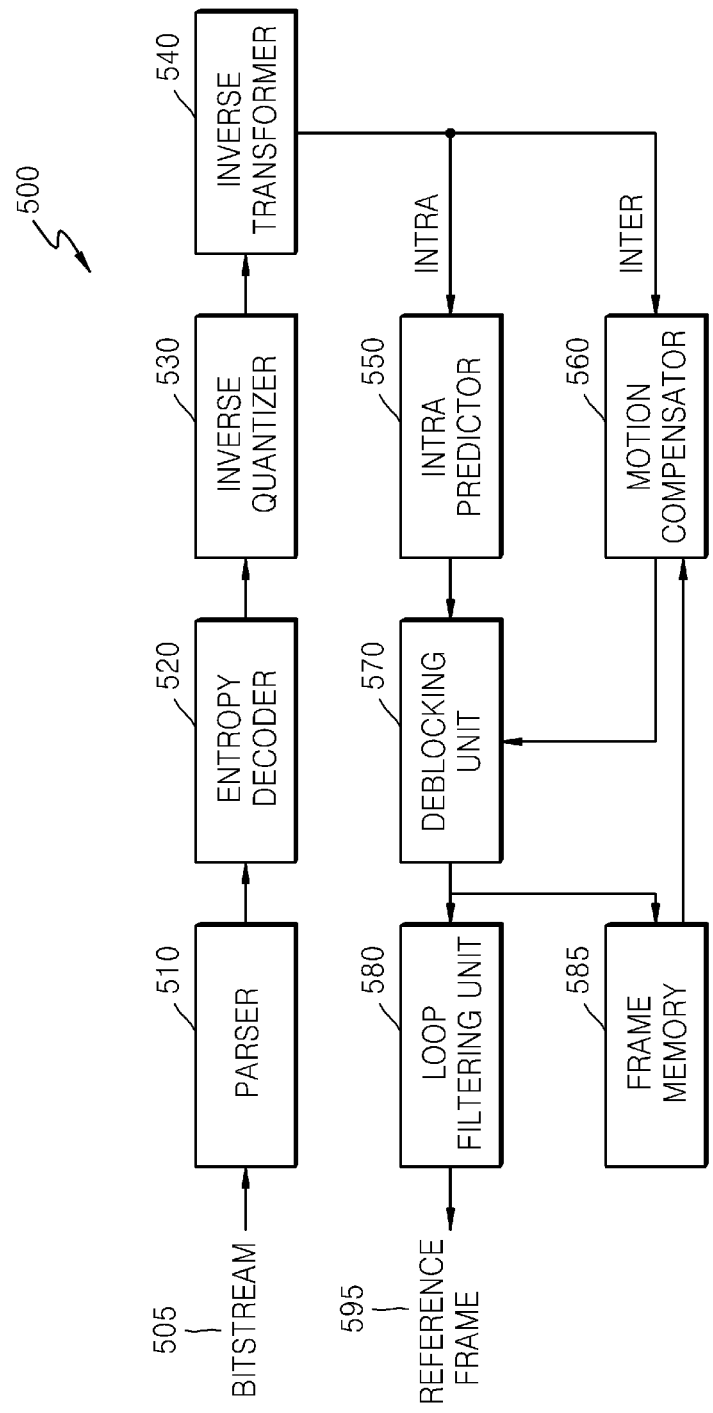
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding, from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame after being post-processed through a deblocking unit 570 and a loop filtering unit 580. Also, the image data, which is post-processed through the deblocking unit 570 and the loop filtering unit 580, may be output as the reference frame 595.

In order for the image data decoder 230 of the video decoding apparatus 200 to decode image data, operations after the parser 510 of the image decoder 500 may be performed.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each LCU.

Specifically, the intra predictor 550 and the motion compensator 560 determine a partition and a prediction mode for each coding unit having a tree structure, and the inverse transformer 540 has to determine a size of a TU for each coding unit.

Figure 6:
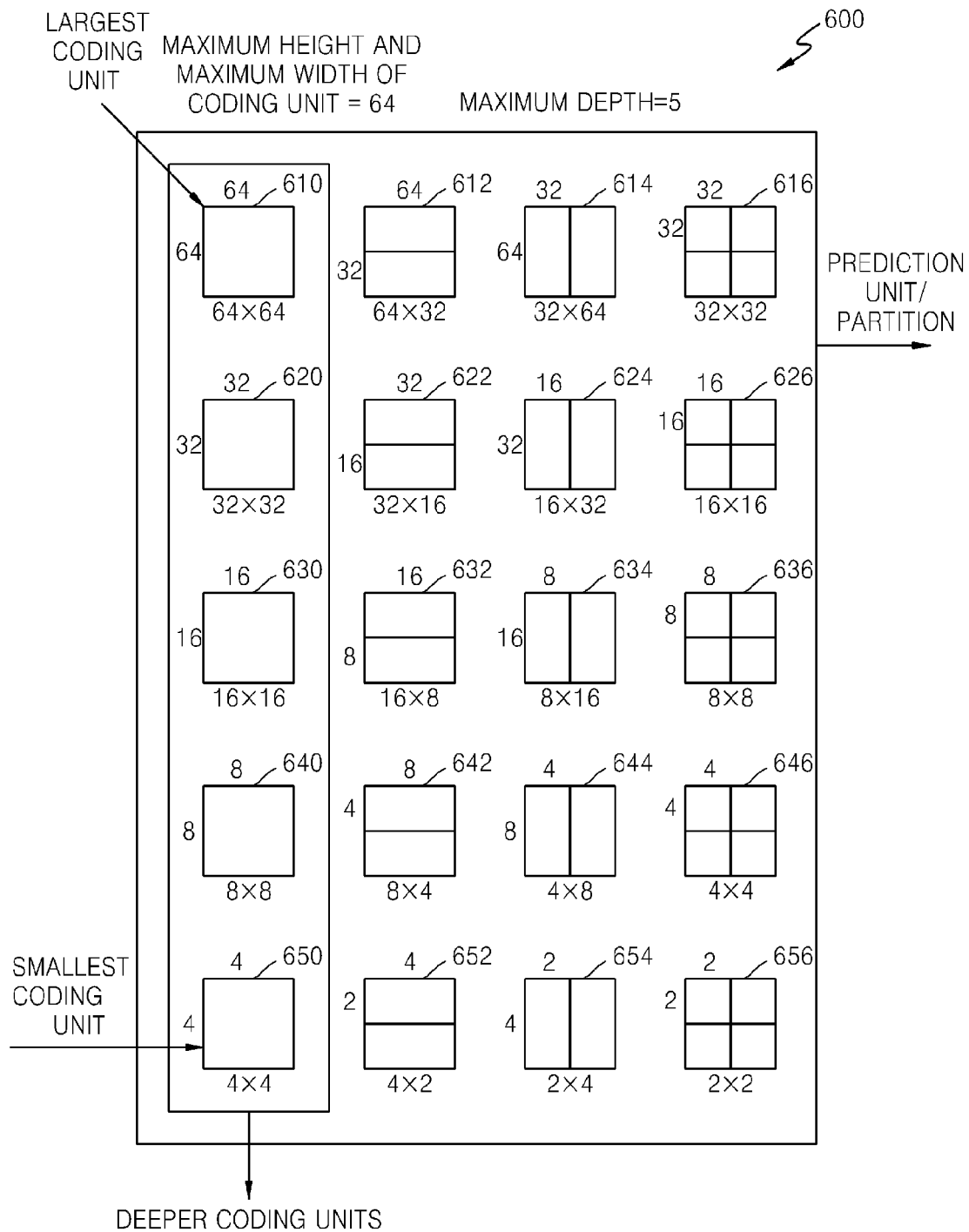
FIG. 6 is a diagram illustrating deeper coding units according to depths, and partitions, according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, the maximum height and the maximum width of the coding units are each 64, and the maximum depth is 4. Because a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is an LCU in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a smallest coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the smallest coding unit and a coding unit of the lowermost depth. A prediction unit of the coding unit 650 is only assigned to a partition having a size of 4×4.

In order to determine the at least one coded depth of the coding units constituting the LCU 610, the coding unit determiner 120 of the video encoding apparatus 100 performs encoding for coding units corresponding to each depth included in the LCU 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a smallest encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units (TUs) 720, according to an exemplary embodiment.

The video encoding apparatus 100 or the video decoding apparatus 200 encodes or decodes an image according to coding units having sizes smaller than or equal to an LCU for each LCU. Sizes of TUs for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the TUs 720 having a size of 32×32.

Also, data of the coding unit 710 having the size of 64×64 may be encoded by performing the transformation on each of the TUs having the size of 32×32, 16×16, 8×8, and 4×4, which are smaller than 64×64, and then a TU having the least coding error may be selected.

FIG. 8 is a diagram for describing encoding information of coding units corresponding to a coded depth, according to an exemplary embodiment.

An output unit 130 of the video encoding apparatus 100 may encode and transmit information 800 about a partition type, information 810 about a prediction mode, and information 820 about a size of a TU for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a size of a TU to be based on when transformation is performed on a current coding unit. For example, the TU may be a first intra TU 822, a second intra TU 824, a first inter TU 826, or a second inter TU 828.

The image data and encoding information extractor 220 of the video decoding apparatus 200 may extract and use the information 800, 810, and 820 for decoding, according to each deeper coding unit.

Figure 9:
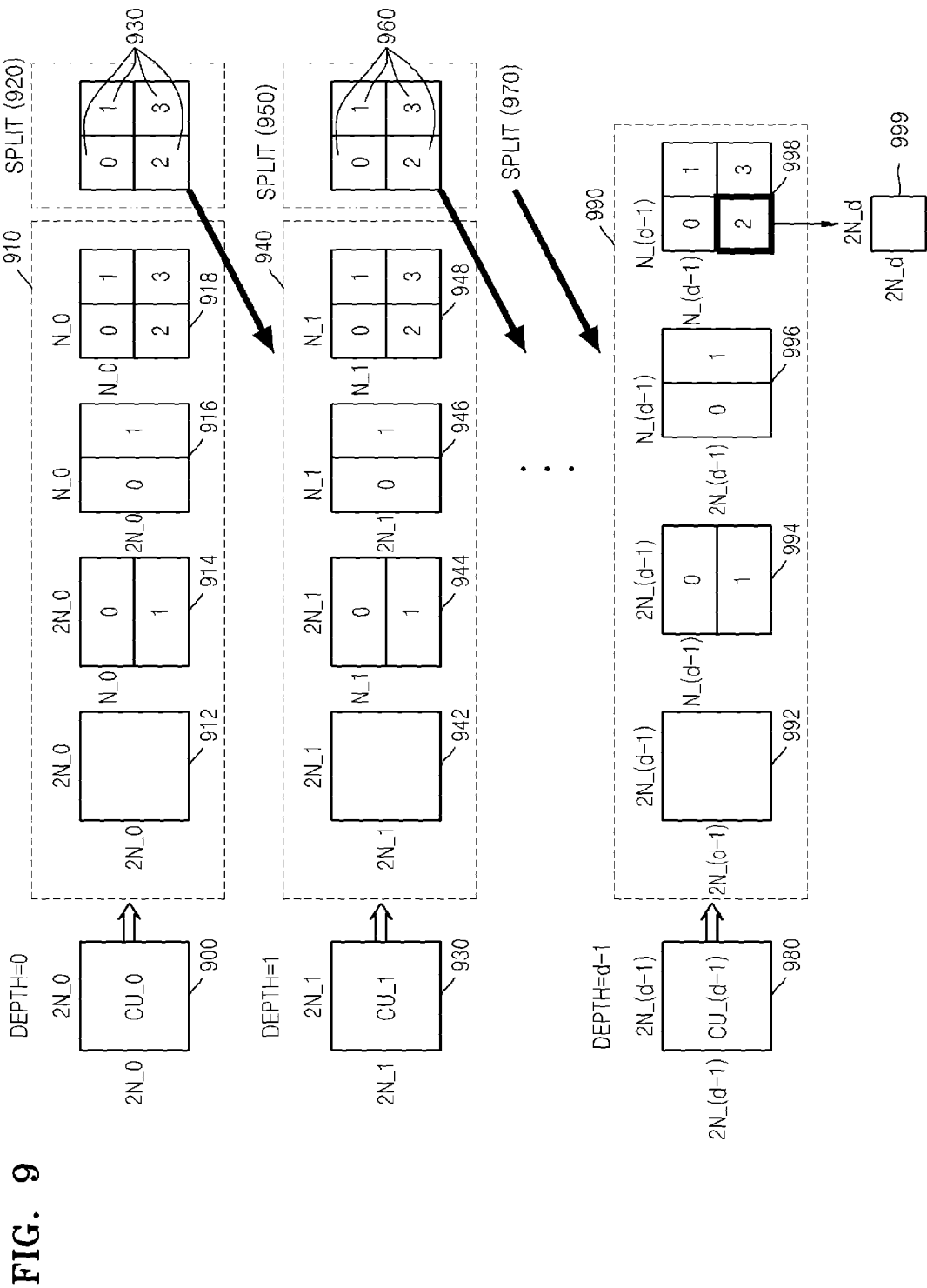
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding of a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is the smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on partition type coding units having a depth of 2 and a size of N_0×N_0 to search for a minimum encoding error.

A prediction unit 940 for prediction encoding of the (partition type) coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, because a maximum depth is d, a coding unit CU_(d−1) having a depth of d−1 is no longer split to a lower depth, and a coded depth for the coding units constituting the current LCU 900 is determined to be d−1 and a partition type of the current LCU 900 may be determined to be N_(d−1)×N_(d−1). Also, because the maximum depth is d, split information for the smallest coding unit 980 is not set.

A data unit 999 may be a 'minimum unit' for the current LCU. A minimum unit may be a rectangular data unit obtained by splitting the smallest coding unit 980 by 4. By performing the encoding repeatedly, the video encoding apparatus 100 may select a depth having the smallest encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0 through d, and a depth having the smallest encoding error may be determined as a coded depth. The coded depth, the partition type of the prediction unit, and the prediction mode may be encoded and transmitted as information about an encoding mode. Also, because a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the coding unit 912. The video decoding apparatus 200 may determine a depth, in which split information is 0, as a coded depth by using split information according to depths, and use information about an encoding mode of the corresponding depth for decoding.

Figure 10:
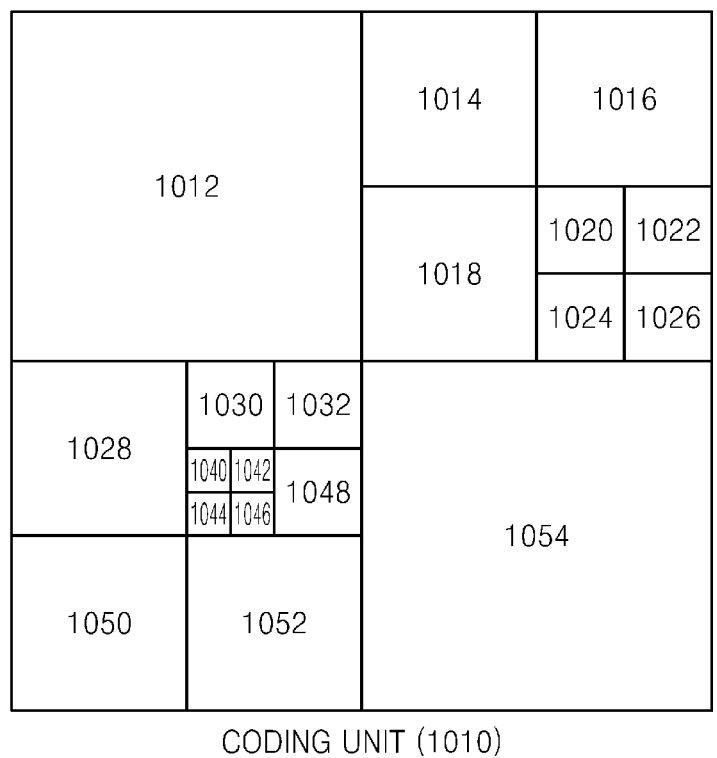
FIGS. 10 through 12 are diagrams for describing a relationship between coding units, prediction units, and TUs, according to an exemplary embodiment.
Figure 11:
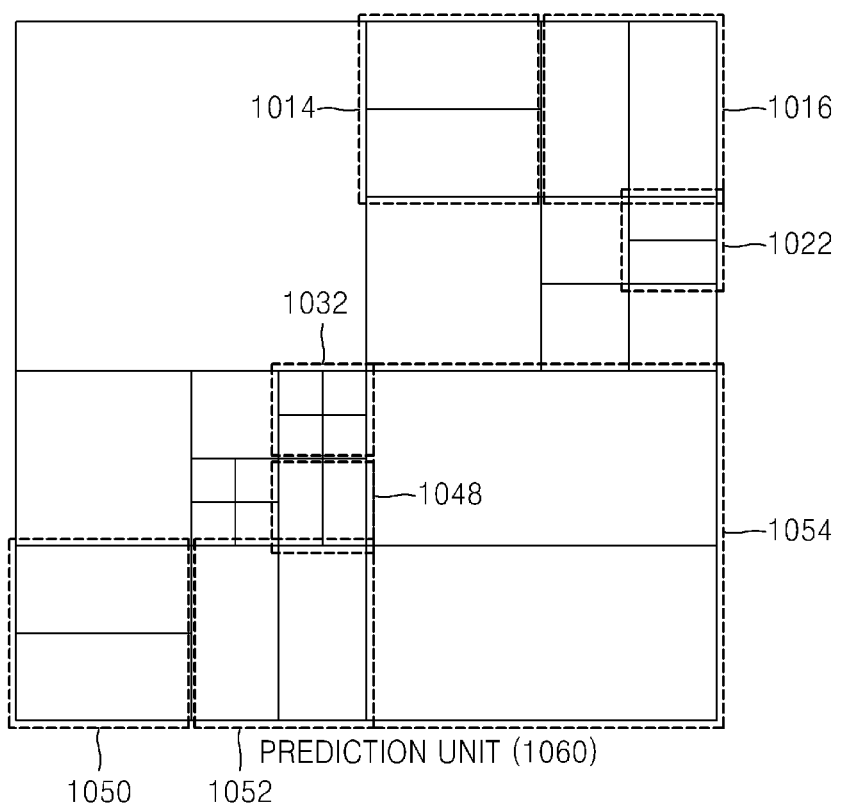
Figure 12:
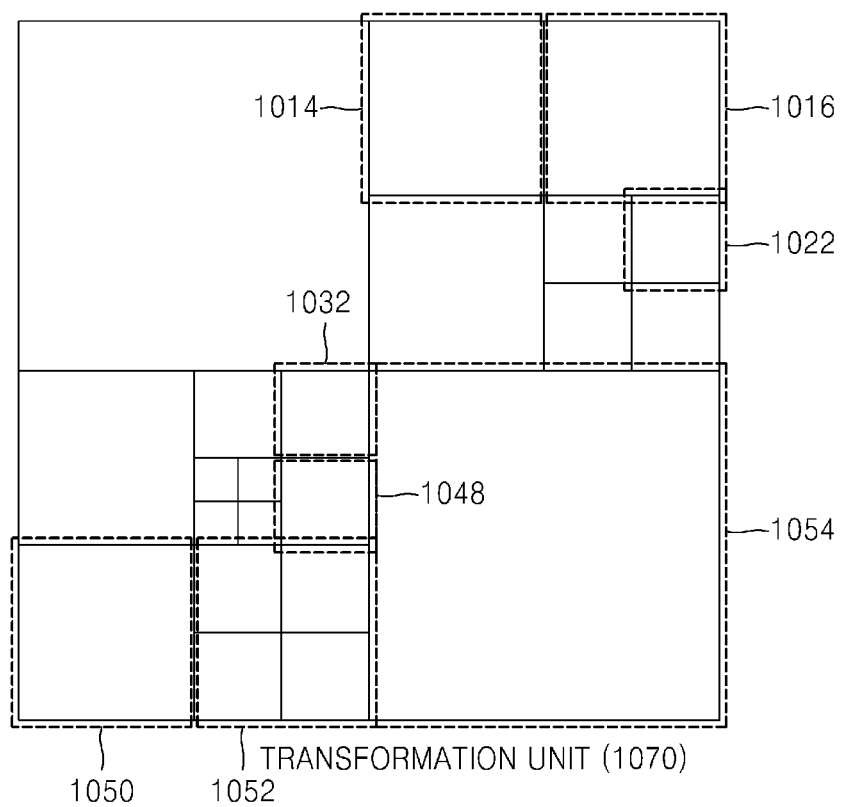

FIGS. 10 through 12 are diagrams for describing a relationship between coding units 1010, prediction units 1060, and TUs 1070 according to an exemplary embodiment.

The coding units 1010 are coding units having a tree structure, corresponding to coded depths determined by the video encoding apparatus 100, in an LCU. The prediction units 1060 are partitions of prediction units of each of the coding units 1010, and the TUs 1070 are TUs of each of the coding units 1010.

When a depth of an LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the TUs 1070 in a data unit that is smaller than the coding unit 1052. Also, the coding units 1014, 1016, 1022, 1032, 1048, 1050, 1052, and 1054 in the TUs 1070 are different from those in the prediction units 1060 in terms of sizes and shapes. In other words, the video encoding apparatus 100 and the video decoding apparatus 200 may perform intra prediction, motion estimation, motion compensation, transformation, and inverse transformation individually on a data unit in the same coding unit.

Accordingly, encoding is recursively performed on each of coding units having a hierarchical structure in each region of an LCU to determine an optimum coding unit, and thus coding units having a recursive tree structure may be obtained. Encoding information may include split information about a coding unit, information about a partition type, information about a prediction mode, and information about a size of a TU. Table 1 shows the encoding information that may be set by the video encoding apparatus 100 and the video decoding apparatus 200.

TABLE 1

| Split Information 0 (Encoding on Coding Unit having Size of 2N × 2N and Current Depth of d) | | | | | Split Information 1 |
|---|---|---|---|---|---|
| | Partition Type | | Size of TU | | |
| Prediction Mode | Symmetrical Partition Type | Asymmetrical Partition Type | Split Information 0 of TU | Split Information 1 of TU | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

The outputter 130 of the video encoding apparatus 100 may output the encoding information of the coding units having a tree structure, and the image data and encoding information extractor 220 of the video decoding apparatus 200 may extract the encoding information of the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, a prediction mode, and a size of a TU may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the TU may be set to be two types in the intra mode and two types in the inter mode. In other words, if split information of the TU is 0, the size of the TU may be 2N×2N, which is the size of the current coding unit. If split information of the TU is 1, the TUs may be obtained by splitting the current coding unit. Also, if a partition type of the current coding unit having the size of 2N×2N is a symmetrical partition type, a size of a TU may be N×N, and if the partition type of the current coding unit is an asymmetrical partition type, the size of the TU may be N/2×N/2.

The encoding information of coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in an LCU may be determined.

Accordingly, if a current coding unit is predicted based on encoding information of adjacent data units, encoding information of data units in deeper coding units adjacent to the current coding unit may be directly referenced and used.

Alternatively, if a current coding unit is predicted based on encoding information of adjacent data units, data units adjacent to the current coding unit are searched using encoding information of the data units, and the searched adjacent coding units may be referred to for predicting the current coding unit.

Figure 13:
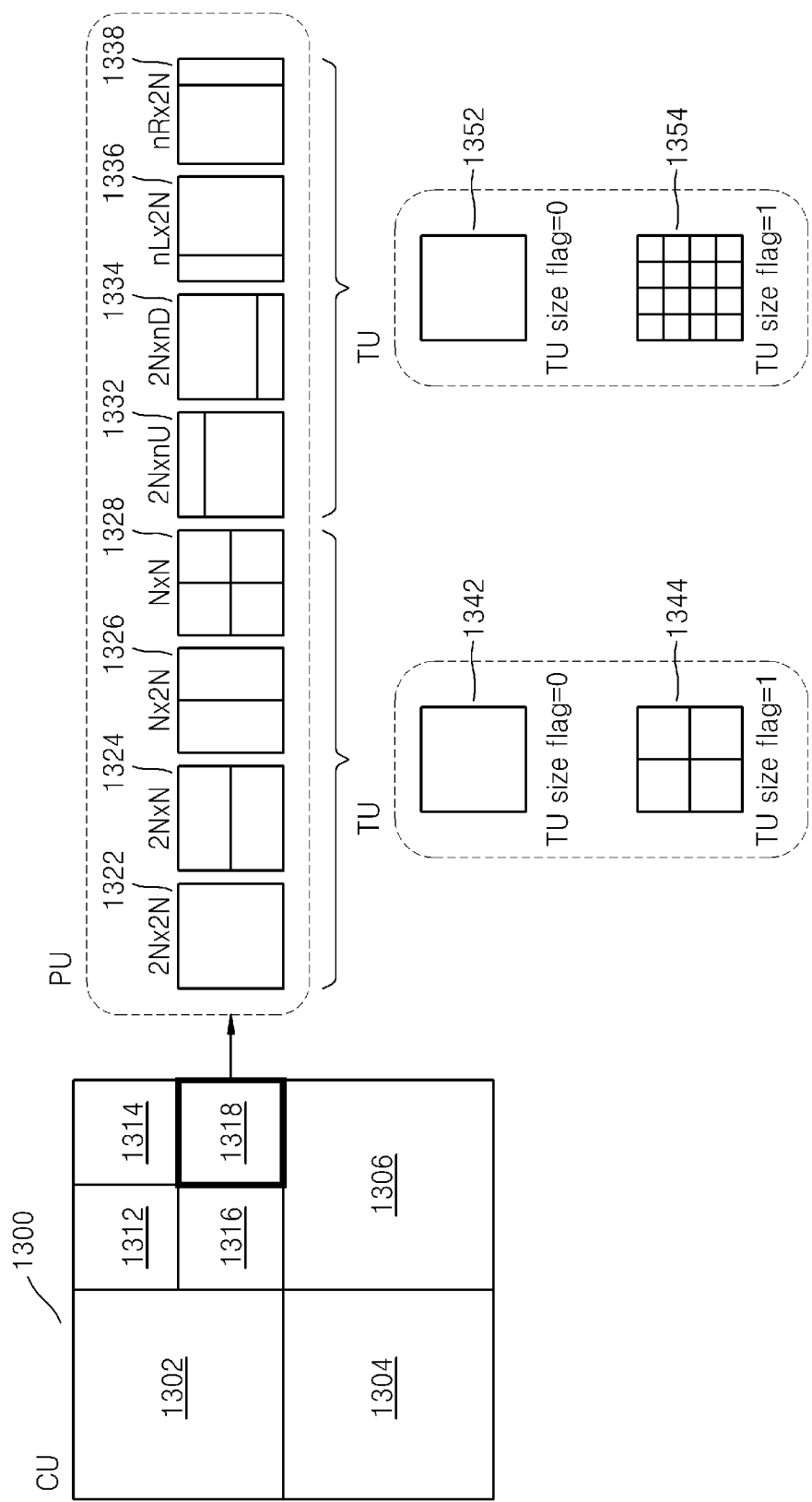
FIG. 13 is a diagram for describing a relationship between a coding unit, a prediction unit, and a TU, according to encoding mode information.

FIG. 13 is a diagram for describing a relationship between a coding unit, a prediction unit, and a TU according to the encoding mode information of Table 1.

set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a TU 1342 having a size of 2N×2N is set if split information (TU size flag) of a TU is 0, and a TU 1344 having a size of N×N is set if a TU size flag is 1.

When the partition type is set to be asymmetrical, i.e., the partition type 1332, 1334, 1336, or 1338, a TU 1352 having a size of 2N×2N is set if a TU size flag is 0, and a TU 1354 having a size of N/2×N/2 is set if a TU size flag is 1.

A process of encoding a quantization parameter (QP) in the quantizer 440 and the entropy encoder 450 of the image encoder 400 illustrated in FIG. 4, and a process of decoding the QP in the entropy decoder 520 and the inverse quantizer 530 of the image decoder 500 illustrated in FIG. 5 will now be described in detail.

Figure 14:
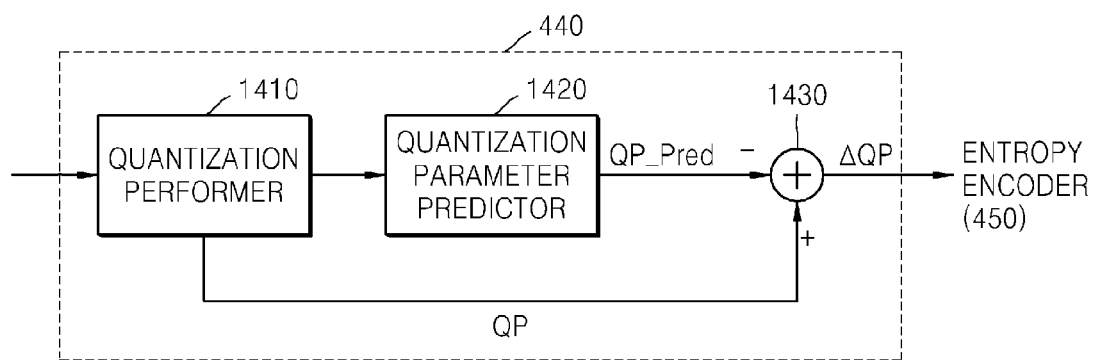
FIG. 14 is a detailed block diagram of a quantizer illustrated in FIG. 4, according to an exemplary embodiment.

FIG. 14 is a detailed block diagram of the quantizer 440 illustrated in FIG. 4, according to an exemplary embodiment.

Referring to FIG. 14, the quantizer 440 includes a quantization performer 1410, a quantization parameter (QP) predictor 1420, and a subtractor 1430.

The quantization performer 1410 quantizes residual data transformed to the frequency domain. The quantization performer 1410 may perform quantization based on a value obtained by dividing input data by a quantization step Q_Step determined according to a QP. For example, the quantization performer 1410 may perform quantization on input data Coeff based on the following equation:

$$Q\_Coeff = sgn(Coeff) * round[(Coeff)/Q\_Step + Offset].$$

Here, Offset denotes an offset, Q_Step denotes a quantization step, and Q_Coeff denotes a quantized result value. Round[X] denotes an operation for outputting an integer that is not greater than and is the closest to a real number X. Sgn(Coeff) denotes a function having value 1 if the value of Coeff is greater than 0, and having value −1 if the value of Coeff is less than 0. As described above, the quantization performer 1410 may perform quantization by dividing the input data by the quantization step Q_Step. The quantization step Q_Step may have a value determined according to the QP. For example, the quantization step Q_Step may be determined according to the QP as shown in Table 2.

TABLE 2

| QP     | 0     | 1      | 2      | 3     | 4 | 5     | 6    | 7     | 8     | 9    | 10 | ... |
|--------|-------|--------|--------|-------|---|-------|------|-------|-------|------|----|-----|
| Q_Step | 0.625 | 0.6875 | 0.8125 | 0.875 | 1 | 1.125 | 1.25 | 1.375 | 1.625 | 1.75 | 2  | ... |
| QP     | ...   | 18     | ...    | 24    | ...| 30   | ...  | 36    | ...   | 42   | ...| 48  |
| Q_Step |       | 5      |        | 10    |   | 20    |      | 40    |       | 80   |    | 160 |

AN LCU 1300 includes coding units 1302, 1304, 1306, 1312, 1314, 1316, and 1318 of coded depths. Here, because the coding unit 1318 is a coding unit of a coded depth, split information may be set to 0. Information about a partition type of the coding unit 1318 having a size of 2N×2N may be Referring to Table 2, whenever the QP is increased by 6, the quantization step Q_Step is doubled. The quantization using the QP and the quantization step Q_Step according to the QP are not limited to the above-described example and may vary.

Opposite to the quantization, inverse quantization is performed by using a value obtained by multiplying the quantization step Q_Step determined according to the QP, by the input data. For example, inverse quantization may be performed by using a value obtained by multiplying a quantization coefficient Q_Coeff by the quantization step Q_Step and then adding a predetermined offset, as shown in the following equation:

$$InverseQ\_Coeff = sgn(Q\_coeff) * round[Q\_Coeff*Q\_Step+Offset].$$

The QP predictor 1420 obtains a predicted QP QP_Pred that is a prediction value of a QP applied to a current coding unit. As described above, in order to perform quantization and inverse quantization on the input data, QP information is required. In order to reduce the amount of data, only a difference between the QP and the predicted QP QP_Pred is transmitted as the QP information. In a decoding process, the QP may be restored by obtaining the predicted QP QP_Pred as in the encoding process and adding the difference included in a bitstream. The QP predictor 1420 may obtain the predicted QP QP_Pred by using a QP determined when a previously encoded coding unit is quantized. Specifically, with respect to an initially quantized coding unit of predetermined data units, the QP predictor 1420 may obtain the predicted QP QP_Pred by using a slice-level initial QP SliceQP. In more detail, the QP predictor 1420 may predict the predicted QP QP_Pred of a first quantization group of a parallel-encodable data unit included in a slice segment, by using the slice-level initial QP SliceQP. A quantization group denotes a set of one or more coding units which share the same predicted QP QP_Pred. The quantization group may include one coding unit or a plurality of coding units. As will be described below, the parallel-encodable data unit may be a thread including LCUs of the same row according to wavefront parallel processing (WPP), or a tile obtained by partitioning a picture with respect to at least one column boundary and/or a row boundary.

Also, the QP predictor 1420 may obtain the predicted QP QP_Pred by using QPs determined in adjacent coding units. The process of obtaining the predicted QP QP_Pred will be described in detail below.

The QP predictor 1420 outputs additional information for obtaining the predicted QP QP_Pred, to the entropy encoder 450.

The subtractor 1430 outputs a QP difference ΔQP that is a difference between the QP applied to the current coding unit and the predicted QP QP_Pred.

Figure 15:
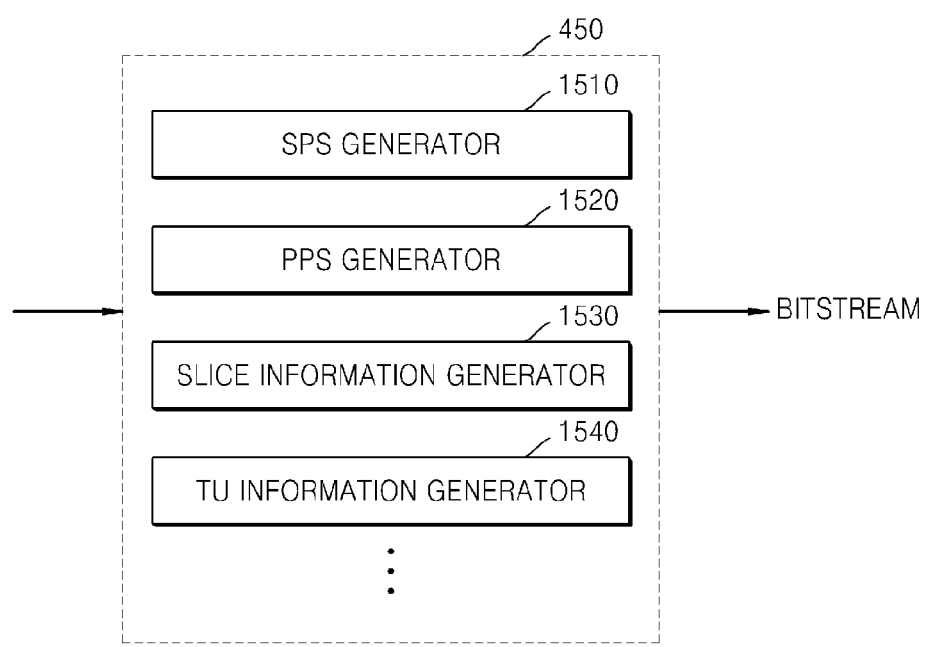
FIG. 15 is a detailed block diagram of an entropy encoder illustrated in FIG. 4, according to an exemplary embodiment.

FIG. 15 is a detailed block diagram of the entropy encoder 450 illustrated in FIG. 4, according to an exemplary embodiment.

The entropy encoder 450 arithmetically encodes syntax elements generated according to a result of encoding a video. As an arithmetic encoding method, context adaptive binary arithmetic coding (CABAC) may be used. Also, the entropy encoder 450 generates a bitstream by transforming video data arithmetically encoded on a video coding layer and information about various parameters related to video encoding, to a format according to a network abstraction layer.

In more detail, referring to FIG. 15, the entropy encoder 450 includes a sequence parameter set (SPS) generator 1510 for generating an SPS including encoding information of a whole sequence, for example, a profile and a level, a picture parameter set (PPS) generator 1520 for generating a PPS including encoding information of each picture included in the sequence, a slice information generator 1530 for generating slice information including encoding information of slice segments included in a picture, and a TU information generator 1540 for generating information about TUs used in a transformation process. As will be described below, the PPS generator 1520 may include syntax init_qp_minus26, which indicates a picture-level initial QP for obtaining a slice-level initial QP SliceQP of each slice included in a picture, in the PPS. Also, the slice information generator 1530 may include syntax slice_qp_delta, which indicates a difference between the syntax init_qp_minus26 indicating the picture-level initial QP and the slice-level initial QP SliceQP, in a slice header.

In addition to the illustrated hierarchical structure, the entropy encoder 450 may generate a bitstream by encapsulating information about a data unit of another lower layer, for example, information about a coding unit.

As described above, with respect to an initially quantized coding unit (or a quantization group) of a predetermined parallel-processable data unit, the QP predictor 1420 may obtain a predicted QP QP_Pred by using the slice-level initial QP SliceQP. Here, the predetermined data units are data units obtained by partitioning a picture according to picture partitioning schemes, for example, slices, slice segments, or tiles.

Figure 16:
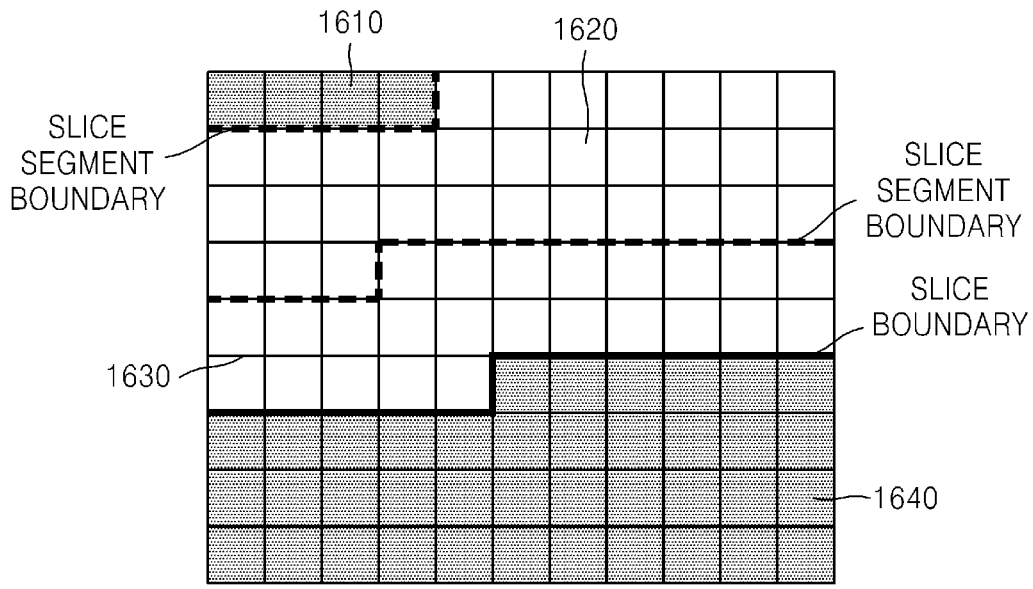
FIG. 16 shows slice segments, slices, and largest coding units (LCUs) that are data units used to partition a picture, according to an exemplary embodiment.

FIG. 16 shows slice segments, slices, and LCUs that are data units used to partition a picture, according to an exemplary embodiment.

Referring to FIG. 16, the picture may be partitioned into a plurality of LCUs. FIG. 16 shows an example in which the picture is partitioned into 11 LCUs in a horizontal direction and 9 LCUs in a vertical direction, that is, a total of 99 LCUs. As described above in relation to FIGS. 1 through 13, each LCU may be encoded and decoded after being partitioned into coding units having a tree structure.

Also, the picture may be partitioned into one or more slices according to slice boundaries. FIG. 16 shows an example that the picture is partitioned into two slices, such as an upper slice and a lower slice, with respect to a slice boundary. Also, one slice may be partitioned into one or more slice segments. FIG. 16 shows an example that the upper slice is partitioned into slice segments 1610, 1620, and 1630 with respect to slice segment boundaries. Also, the lower slice includes one slice segment 1640.

Each of the slice segments 1610, 1620, 1630, and 1640 may be classified into a dependent slice segment or an independent slice segment according to whether the slice segment refers to information included in another slice segment. A dependent slice segment is a slice segment in which a partial syntax element included in a slice segment header may be determined with reference to a syntax element of a previous slice segment that is previously processed according to an encoding or decoding order. An independent slice segment is a slice segment in which a syntax element of a slice segment header may be determined without reference to information of a previous slice segment.

Figure 17:
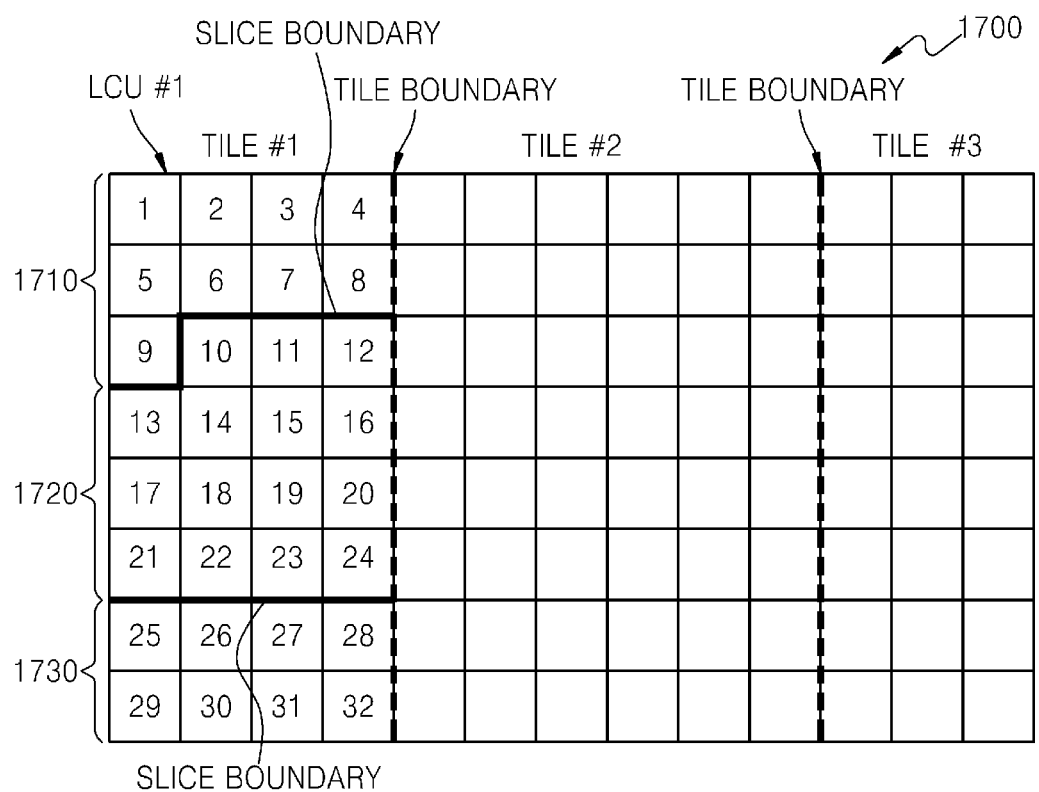
FIG. 17 shows tiles and slice segments that are data units used to partition a picture, according to an exemplary embodiment.

FIG. 17 shows tiles and slice segments that are data units used to partition a picture, according to an exemplary embodiment.

FIG. 17 shows an example in which one picture 1700 is partitioned into three tiles with respect to column boundaries 1701 and 1703. A picture may be partitioned into a plurality of tiles with respect to column boundaries and/or row boundaries. Although a picture is partitioned into tiles with respect to only column boundaries in FIG. 17, the picture may also be partitioned into tiles with respect to only row boundaries or both row boundaries and column boundaries.

Also, one tile may include a plurality of slice segments. FIG. 17 shows an example that a tile #1 is partitioned into three slice segments 1710, 1720, and 1730 with respect to slice boundaries 1702 and 1704.

A tile is a set of LCUs partitioned with respect to column boundaries and/or row boundaries, and is an independent data processing unit on which prediction or context prediction is not allowed across a column boundary or a row boundary. That is, a tile is an independent data processing unit that does not refer to information of another tile information, and a plurality of tiles may be processed in parallel. Location information of column boundaries and row boundaries may be included in an SPS or a PPS. In a decoding process, location information of column boundaries and row boundaries may be obtained from an SPS or a PPS, a picture may be partitioned into a plurality of tiles based on the obtained location information of the column boundaries and the row boundaries, and then the partitioned tiles may be decoded in parallel.

Accordingly, while the tiles of the picture 1700 are processed in parallel, and each tile may be encoded or decoded according to LCUs. In FIG. 17, numbers marked in LCUs denote a scan order of the LCUs in each tile, that is, an encoding or decoding order.

According to an exemplary embodiment, correlations among slice segments, slices, tiles, and LCUs, that are data units used to partition a picture, may be defined as described below.

With respect to each slice and tile, LCUs encoded (decoded) according to a predetermined scan order should satisfy at least one of conditions (i) and (ii) described below.

(Condition i) All LCUs included in one slice belong to the same tile.

(Condition ii) All LCUs included in one tile belong to the same slice.

Also, with respect to each slice segment and tile, LCUs encoded (decoded) according to a predetermined scan order should satisfy at least one of conditions (a) and (b) described below.

(Condition a) All LCUs included in one slice segment belong to the same tile.

(Condition b) All LCUs included in one tile belong to the same slice segment.

Within a range of satisfying at least one of the conditions (i) and (ii) and at least one of the conditions (a) and (b), one picture may be partitioned by using slices, slice segments, tiles, and LCUs.

Figure 18A:
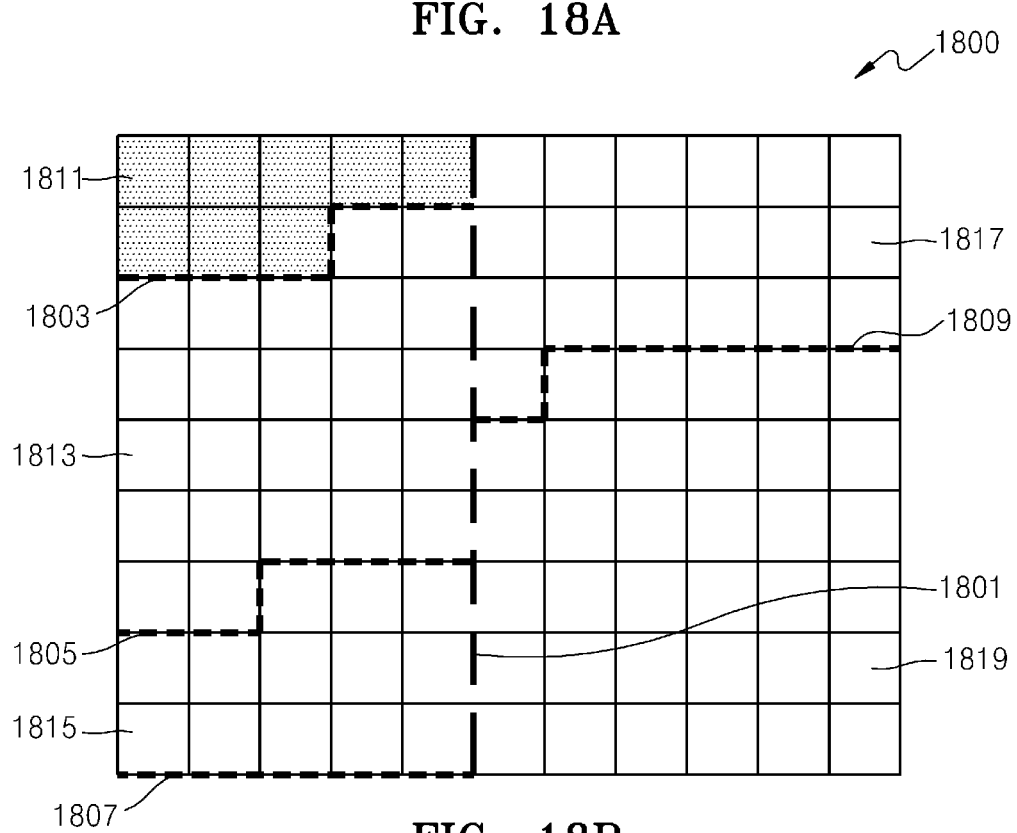
FIGS. 18A and 18B show correlations among tiles, slice segments, slices, and LCUs, according to an exemplary embodiment.
Figure 18B:
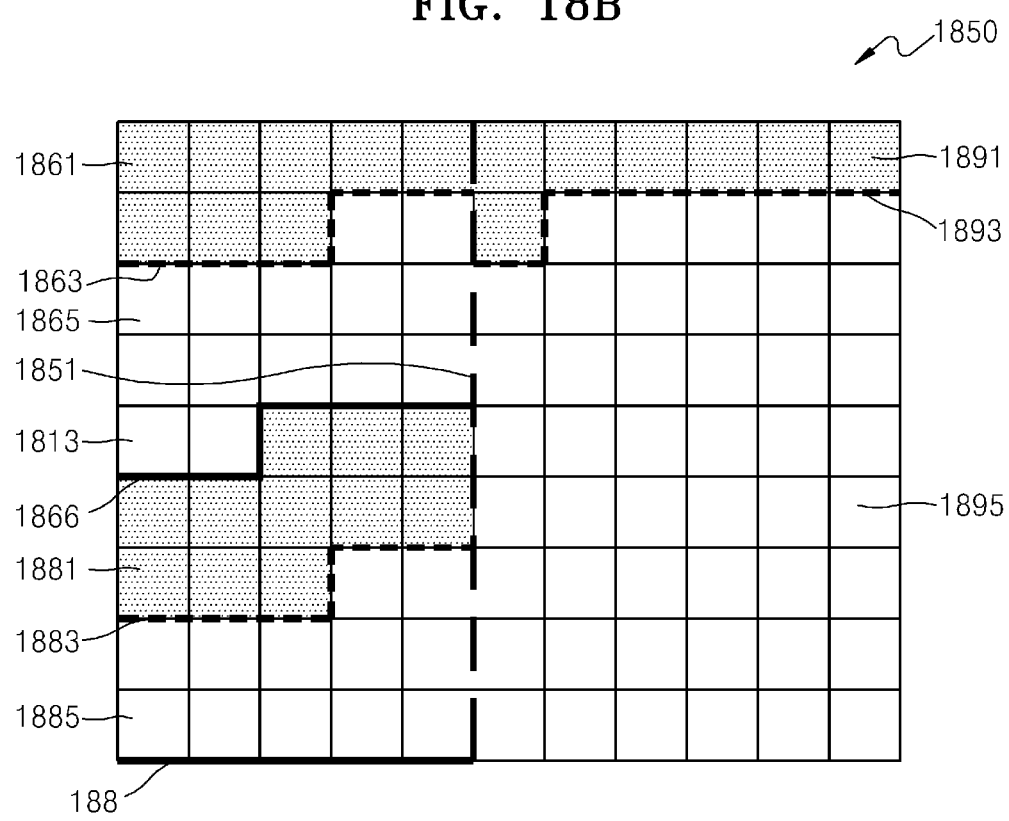

FIGS. 18A and 18B show correlations among tiles, slice segments, slices, and LCUs, according to an exemplary embodiment;

Referring to FIG. 18A, a picture 1800 is partitioned into five slice segments 1811, 1813, 1815, 1817, and 1819 due to slice segment boundary lines 1803, 1805, 1807, and 1809. Also, because one slice is formed of one independent slice segment 1811 and four dependent slice segments 1813, 1815, 1817, and 1819, the picture 1800 includes one slice.

Also, the picture 1800 is partitioned into two tiles due to a tile boundary 1801. As such, a left tile includes three slice segments 1811, 1813, and 1815, and a right tile includes two slice segments 1817, and 1819.

Initially, it is checked whether the slice segments 1811, 1813, 1815, 1817, and 1819, the tiles, and the LCUs satisfy at least one of the conditions (a) and (b) described above in relation to FIG. 17. All LCUs of the slice segments 1811, 1813, and 1815 are included in the left tile, and thus satisfy the condition (a). Besides, all LCUs of the slice segments 1817 and 1819 are included in the right tile, and thus also satisfy the condition (a).

It is checked whether the slices, the tiles, and LCUs satisfy at least one of the conditions (i) and (ii) described above in relation to FIG. 17. All LCUs of the left tile are included in one slice, and thus satisfy the condition (ii). Besides, all LCUs of the right tile are included in one slice, and thus also satisfy the condition (ii).

Referring to FIG. 18B, a picture 1850 is partitioned into two tiles, e.g., a left tile and a right tile, due to a tile boundary line 1851. Also, the picture 1850 is partitioned into three slices due to slice boundary lines 1866 and 1868, the left tile is partitioned into an upper left slice and a lower left slice with respect to the slice boundary line 1866, and the right tile is formed of one right slice.

The upper left slice is partitioned into one independent slice segment 1861 and one dependent slice segment 1865 with respect to a slice segment boundary line 1863. The lower left slice is partitioned into one independent slice segment 1881 and one dependent slice segment 1885 with respect to a slice segment boundary line 1883. The right slice may be partitioned into one independent slice segment 1891 and one dependent slice segment 1895 with respect to a slice segment boundary line 1893.

Initially, it is checked whether the slice segments 1861, 1865, 1881, 1885, 1891, and 1895, the tiles, and the LCUs satisfy at least one of the conditions (a) and (b). All LCUs of the slice segments 1861 and 1865 are included in the left tile, and thus satisfy the condition (a). Besides, all LCUs of the slice segments 1881 and 1883 are included in the same left tile, and thus also satisfy the condition (a). Furthermore, all LCUs of the slice segments 1891 and 1893 included in the same right tile, and thus also satisfy the condition (a).

It is checked whether the slices, the tiles, and LCUs satisfy at least one of the conditions (i) and (ii). All LCUs of the upper left slice are included in the left tile, and thus satisfy the condition (i). Besides, all LCUs of the lower left slice are included in the left tile, and thus also satisfy the condition (i). Furthermore, all LCUs of the right slice are included in the right tile and all LCUs of the right tile are included in the right slice, and thus satisfy the condition (i).

Figure 19:
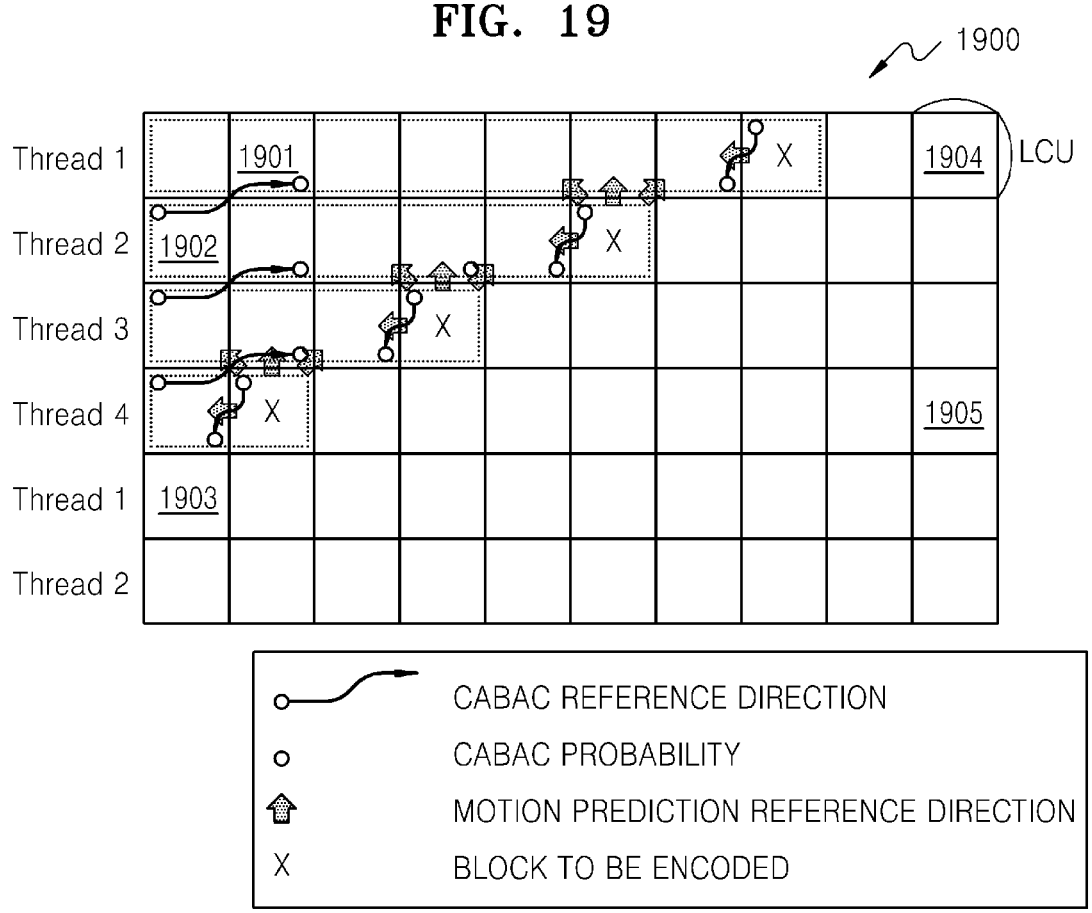
FIG. 19 is a reference diagram for describing wavefront parallel processing (WPP), according to an exemplary embodiment.

FIG. 19 is a reference diagram for describing WPP, according to an exemplary embodiment.

WPP denotes a process of processing an LCU after completely processing an upper right LCU for parallel encoding/decoding. In more detail, WPP sets a probability model of a first LCU of each thread by using probability information obtained by processing a second LCU of an upper thread. For example, referring to FIG. 19, the entropy encoder 450 sets a probability model of a first LCU 1902 of a thread 2 for entropy encoding by using a probability model obtained after entropy-encoding a second LCU 1901 of a thread 1. As described above, when LCUs of each thread are entropy-encoded, the entropy encoder 450 may use a probability information updated by processing an upper right LCU, thereby allowing parallel entropy encoding.

Also, according to WPP, because a first LCU of each thread is processed after a second LCU of an upper thread is completely processed, LCUs of each thread may be obtained by using motion prediction information, for example, predicted motion vector information, of LCUs of an upper thread. Accordingly, in FIG. 19, LCUs included in threads 1 through 4 may be processed in parallel after upper right LCUs are completely processed.

Data units processed in parallel after being allocated to multi-cores of a central processing unit (CPU) or a graphics processing unit (GPU) of an encoding apparatus or a decoding apparatus are defined as threads. In more detail, it is assumed that the CPU or the GPU includes four multi-cores and four data units may be processed in parallel. In this case, as illustrated in FIG. 19, LCUs of the threads 1 through 4 are allocated to the four multi-cores and are processed in parallel. As described above, according to WPP, an LCU of a thread N (N is an integer) is processed after being delayed until an upper right LCU included in a thread N–1 is completely processed.

According to the above-described WPP, in an entropy encoding process, an LCU of each thread may determine a probability model for entropy encoding after an upper right LCU is completely entropy-encoded. However, from among syntax elements to be entropy-encoded, syntax cu_qp_delta indicating a difference between a QP and a predicted QP QP_Pred may not be directly entropy-encoded. This is because the predicted QP QP_Pred should be obtained to determine the difference between the QP and the predicted QP QP_Pred and uses a QP determined in a previously processed coding unit according to, for example, a raster scan order. In more detail, referring to FIG. 19, a predicted QP QP_Pred of an LCU 1903 may be predicted as a QP of an LCU 1905 previously processed according to a raster scan order, or a QP determined in a quantization process of an LCU 1904 previously processed in the same thread. In any case, entropy encoding of the LCU 1903 may be performed only after the LCU 1905 previously processed according to a raster scan order or the LCU 1904 previously processed in the same thread is completely encoded. As described above, if a predicted QP is obtained based on a QP of a previous coding unit, processing may be delayed until the previous coding unit is processed and thus a bottleneck problem may be generated. Accordingly, if a predicted QP is obtained based on a QP of a previous coding unit, overall performance of parallel processing may be reduced.

Similarly, in an entropy decoding process, an LCU of each thread may be entropy-decoded after an upper right LCU is completely entropy-decoded. Even according to WPP, in an inverse quantization process, a bottleneck problem may be generated. In order to obtain a QP that is a parameter required to perform inverse quantization, a process of obtaining a predicted QP QP_Pred should be performed first. As described above, the predicted QP QP_Pred of the LCU 1903 may be predicted as a QP determined in an inverse quantization process of the LCU 1905 previously processed according to a raster scan order, or a QP determined in an inverse quantization process of the LCU 1904 previously processed in the same thread. Accordingly, a decoding process of the LCU 1903 may be performed only after the LCU 1905 previously processed according to a raster scan order or the LCU 1904 previously processed in the same thread is completely decoded.

As described above, if a QP determined in a previously processed LCU or a QP determined in a previous LCU of the same thread is used as a predicted QP QP_Pred for performing quantization or inverse quantization on an LCU, the predicted QP QP_Pred may be obtained only after the previous LCU is completely processed.

Accordingly, according to an exemplary embodiment, because a slice-level initial QP SliceQP is used as a QP predictor QP_Predictor of an initially quantized data unit from among data units obtained by partitioning a picture, quantization/inverse quantization may be performed on the initially quantized data unit regardless of a processing order of data units.

Figure 20:
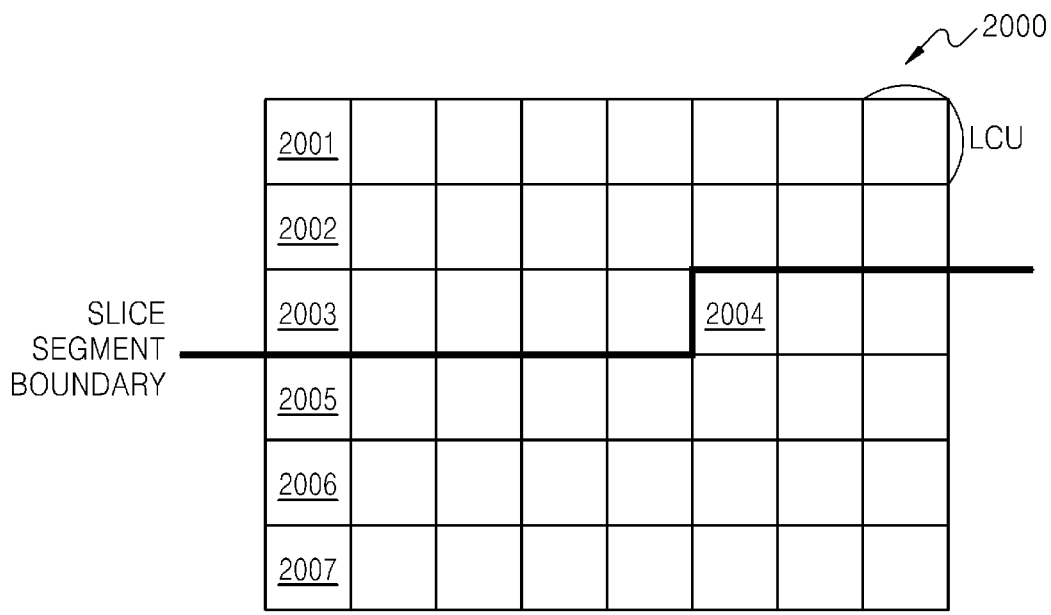
FIG. 20 is a diagram for describing a process of obtaining a predicted quantization parameter (QP) of an LCU included in a slice segment, according to an exemplary embodiment.

FIG. 20 is a diagram for describing a process of obtaining a predicted QP QP_Pred of an LCU included in a slice segment, according to an exemplary embodiment. In FIG. 20, it is assumed that a picture 2000 is partitioned into two slice segments with respect to a slice segment boundary.

The quantization performer 1410 determines an optimal QP for quantizing coding units having a tree structure in consideration of a rate-distortion (R-D) cost, quantizes the coding units having a tree structure by using the determined QP, and outputs QP information.

The QP predictor 1420 outputs a predicted QP QP_Pred by predicting a QP of each coding unit. The predicted QP QP_Pred may be predicted by using various methods in consideration of, for example, a processing order or a location of a current coding unit.

For example, with respect to an initially quantized coding unit of a parallel-processable data unit included in a slice segment or an initially quantized coding unit included in a tile, the QP predictor 1420 may obtain the predicted QP QP_Pred by using a slice-level initial QP SliceQP. Referring to FIG. 20, with respect to an initially quantized coding unit included in a first LCU 2001 of an upper slice segment, the QP predictor 1420 may obtain the predicted QP QP_Pred by using the slice-level initial QP SliceQP. Similarly, with respect to an initially quantized coding unit included in a first LCU 2004 of a lower slice segment, the QP predictor 1420 may obtain the predicted QP QP_Pred by using the slice-level initial QP SliceQP.

Also, with respect to and initially quantized coding unit included in a first LCU of each thread of a slice segment, the QP predictor 1420 may obtain the predicted QP QP_Pred by using the slice-level initial QP SliceQP. Referring back to FIG. 20, with respect to initially quantized coding units included in first LCUs 2002 and 2003 of threads of the upper slice segment, the QP predictor 1420 may obtain the predicted QP QP_Pred by using the slice-level initial QP SliceQP. Similarly, with respect to initially quantized coding units included in first LCUs 2005, 2006, and 2007 of threads of the lower slice segment, the QP predictor 1420 may obtain the predicted QP QP_Pred by using the slice-level initial QP SliceQP.

Specifically, if a plurality of threads each including LCUs of the same row are processable in parallel according to WPP, with respect to initially quantized coding units (a quantization group) included in first LCUs of threads of a slice segment, the QP predictor 1420 may predict the predicted QP QP_Pred by using the slice-level initial QP SliceQP. In other words, in a quantization process according to WPP, the QP predictor 1420 may obtain the predicted QP QP_Pred of an initially quantized coding unit included in a first LCU of each thread, by using the slice-level initial QP SliceQP. If WPP is not used, the QP predictor 1420 may obtain the predicted QP QP_Pred of only an initially quantized coding unit included in a first LCU of a slice segment, by using the slice-level initial QP SliceQP, and may obtain the predicted QPs QP_Pred of coding units other than the initially quantized coding unit, by using QPs of adjacent coding units.

Also, with respect to an initially quantized quantization group of each parallel-processable tile, the QP predictor 1420 may predict the predicted QP QP_Pred by using the slice-level initial QP SliceQP.

Figure 21:
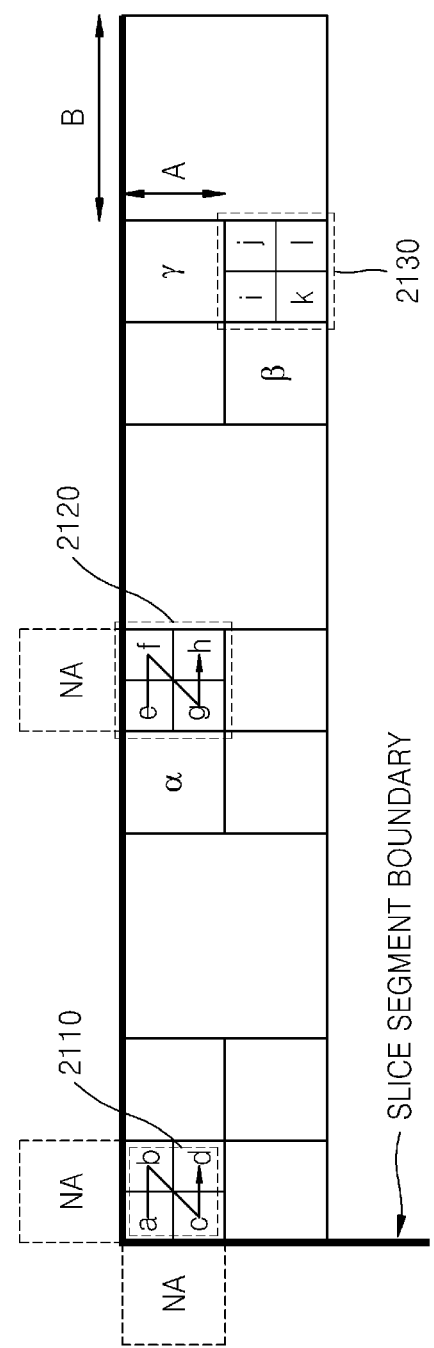
FIG. 21 is a diagram for describing a process of obtaining a predicted QP of a coding unit included in an LCU, according to an exemplary embodiment.

FIG. 21 is a diagram for describing a process of obtaining a predicted QP QP_Pred of a coding unit included in an LCU, according to an exemplary embodiment.

Referring to FIG. 21, a first quantization group 2110 to be initially quantized and included in a first LCU of a slice segment according to a predetermined scan order includes coding unit a, b, c, and d. The predicted QP QP_Pred of the coding unit a is obtained by using a slice-level initial QP SliceQP. The coding units a, b, c, and d included in the first quantization group 2110 are smaller than a smallest coding unit that may have syntax cu_qp_delta, and thus have the same predicted QP QP_Pred.

As another example, with respect to coding units other than the initial coding units a, b, c, and d, the QP predictor 1420 may obtain the predicted QP QP_Pred based on an average of QPs of upper and left adjacent coding units. For example, predicted QPs of coding units e, f, g, and h of a quantization group 2120 may be determined by using an average of a QP QP_α of a left coding unit a and a QP of an upper coding unit. However, the upper coding unit of the coding units e, f, g, and h is not available, a QP of a previously processed coding unit may be used instead. That is, the QP predictor 1420 may obtain the predicted QPs of the coding units e, f, g, and h as shown below.

$$QP\_Pred\_e=(QP\_\alpha+QP\_\alpha+1)>>1;$$

$$QP\_Pred\_f=(QP\_\alpha+QP\_e+1)>>1;$$

$$QP\_Pred\_g=(QP\_\alpha+QP\_f+1)>>1; \text{ and}$$

$$QP\_Pred\_h=(QP\_\alpha+QP\_g+1)>>1;$$

Predicted QPs of coding units i, j, k, and l of a quantization group 2130 may be determined by using an average of a QP QP_β of a left coding unit β and a QP QP_γ of an upper coding unit γ. Because both the QP QP_β of the left coding unit β and the QP QP_γ of an upper coding unit γ are available, all of the coding units i, j, k, and l may have (QP_β+QP_γ+1)>>1 as their predicted QP.

Upper and left adjacent coding units of the initially processed first quantization group 2110 are not available, if QPs of the upper and left adjacent coding units of the coding units a, b, c, and d are assumed as the slice-level initial QP SliceQP, like the other coding units, the predicted QP QP_Pred of the coding units a, b, c, and d included in the initially processed first quantization group 2110 is also regarded as being predicted by using an average of QPs of upper and left adjacent coding units.

As described above, with respect to a first quantization group of a parallel-processable data unit included in a slice segment, the QP predictor 1420 obtains the predicted QP QP_Pred by using the slice-level initial QP SliceQP. A process of obtaining the slice-level initial QP SliceQP will now be described.

The slice-level initial QP SliceQP may be obtained by using a picture-level initial QP init_qp_minus26, and syntax slice_qp_delta indicating a difference between the picture-level initial QP init_qp_minus26 and the slice-level initial QP SliceQP as shown in the following equation; SliceQP=26+init_qp_minus26+slice_qp_delta. The picture-level initial QP init_qp_minus26 is a value obtained by subtracting 26 (or another preset constant) from an average of QPs of initial coding units of each slice included in a picture. The syntax slice_qp_delta corresponds to an adjustment value for determining the slice-level initial QP SliceQP of coding units included in a slice, and may be changed due to cu_qp_delta set at a coding unit level. The cu_qp_delta corresponds to an adjustment value for changing a QP at a coding unit level. If cu_qp_delta_enable_flag is set as 1, a coding unit larger than a smallest coding unit determined according to syntax diff_cu_qp_delta_depth may have the cu_qp_delta. For example, syntax information (cu_qp_delta) indicating a difference between the slice-level initial QP SliceQP and a QP of an initially quantized coding unit included in a first LCU of each thread may be included in a TU data set including transformation information of coding units.

FIGS. 22 through 24 show syntax included in headers of data units having a tree structure in order to predict QPs, according to exemplary embodiments.

FIG. 22 is a table showing QP-related syntax provided to a PPS, according to an exemplary embodiment.

Referring to FIG. 22, the PPS generator 1520 may include syntax init_qp_minus26 2210, which is additional information for obtaining a slice-level initial QP SliceQP of each slice included in a picture, in the PPS. Also, the PPS generator 1520 may include cu_qp_delta_enabled_flag 2220, which is a flag indicating whether a QP is changeable at a coding unit level, and diff_cu_qp_delta_depth 2230, which is syntax for determining the size of a smallest coding unit that may have cu_qp_delta, in the PPS. The syntax diff_cu_qp_delta_depth 2230 may indicate a depth of the size of the smallest coding unit that may have the cu_qp_delta. For example, when the size of an LCU having a depth 0 is 64×64, if the syntax diff_cu_qp_delta_depth 2230 has a value of 2, only coding units having depths equal to or less than 2, i.e., coding units having sizes equal to or greater than 16×16, may have the cu_qp_delta. Also, the PPS generator 1520 may include entropy_coding_sync_enabled_flag 2240, which indicates whether parallel entropy encoding is performed on a plurality of threads included in a slice segment, in the PPS. If the entropy_coding_sync_enabled_flag 2240 is 1, the entropy_coding_sync_enabled_flag 2240 indicates that parallel entropy encoding is performed on a plurality of threads according to WPP as described above. If the entropy_coding_sync_enabled_flag 2240 is 0, the entropy_coding_sync_enabled_flag 2240 indicates that parallel entropy encoding according to WPP is not performed.

As described above, specifically, if WPP is performed, with respect to an initially quantized coding unit included in a first LCU of a thread included in a slice segment, the QP predictor 1420 may predict a predicted QP QP_Pred by using the slice-level initial QP SliceQP. Also, with respect to an initially quantized quantization group of each parallel-processable tile, the QP predictor 1420 may predict the predicted QP QP_Pred by using the slice-level initial QP SliceQP.

FIG. 23 is a table showing QP-related syntax provided to a slice segment header, according to an exemplary embodiment.

Referring to FIG. 23, the slice information generator 1530 may include syntax slice_qp_delta, which indicates a difference between syntax init_qp_minus26 indicating a picture-level initial QP and a slice-level initial QP SliceQP, in a slice header.

FIG. 24 is a table showing QP-related syntax added into transformation unit information, according to an exemplary embodiment.

Referring to FIG. 24, the TU information generator 1540 may include size information 2410 (cu_qp_delta_abs) and sign information 2420 (cu_qp_delta_sign) of syntax cu_qp_delta, which indicates a difference between a QP at a coding unit level and a predicted QP QP_Pred, in the TU information.

Figure 25:
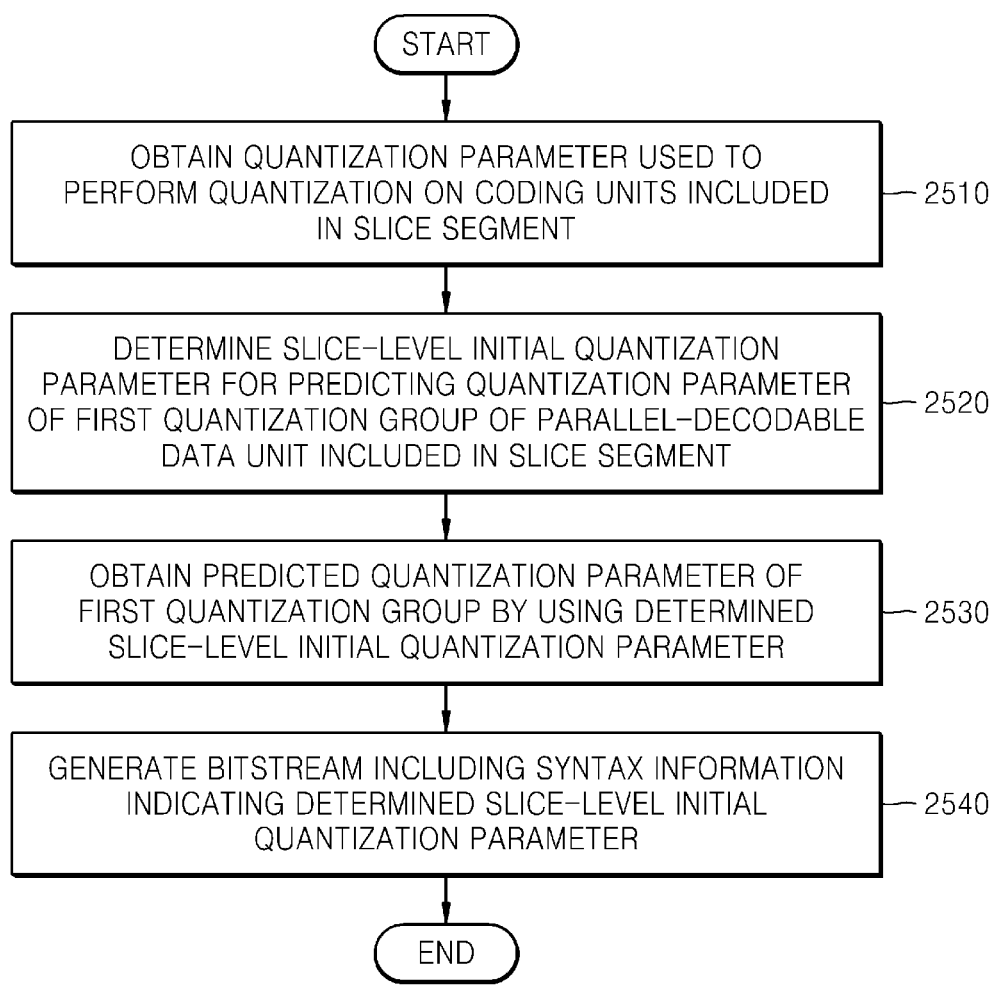
FIG. 25 is a flowchart of a video encoding method according to an exemplary embodiment.

FIG. 25 is a flowchart of a video encoding method according to an exemplary embodiment.

Referring to FIG. 25, in operation 2510, the quantization performer 1410 obtains a QP used to perform quantization on coding units included in a slice segment.

In operation 2520, the QP predictor 1420 determines a slice-level initial QP SliceQP for predicting a QP of a first quantization group of a parallel-encodable data unit included in the slice segment. As described above, the parallel-encodable data unit may be a thread including LCUs of the same row according to WPP, or a tile obtained by partitioning a picture with respect to at least one column boundary and/or a row boundary.

In operation 2530, the QP predictor 1420 obtains a predicted QP QP_Pred of the first quantization group by using the determined slice-level initial QP SliceQP. In more detail, if parallel entropy encoding is performed on a plurality of threads included in a slice segment according to WPP, the QP predictor 1420 may obtain the predicted QP QP_Pred of an initially quantized coding unit of a first LCU of each thread, by using the slice-level initial QP SliceQP. Also, with respect to an initially quantized quantization group of each parallel-processable tile, the QP predictor 1420 may predict the predicted QP QP_Pred by using the slice-level initial QP SliceQP.

Also, even when WPP is not performed, the QP predictor 1420 may obtain the predicted QP QP_Pred of the initially quantized coding unit of the first LCU of the slice segment, by using the slice-level initial QP SliceQP. Besides, the QP predictor 1420 may obtain the predicted QP QP_Pred of an initially quantized coding unit included in the tile, by using the slice-level initial QP SliceQP. Furthermore, the QP predictor 1420 may obtain the predicted QP QP_Pred of a coding unit based on an average of QPs of upper and left adjacent coding units of the coding unit.

In operation 2540, the entropy encoder 450 adds syntax information for determining the slice-level initial QP SliceQP, into a bitstream. As described above, the PPS generator 1520 may include syntax init_qp_minus26, which indicates a picture-level initial QP for obtaining the slice-level initial QP SliceQP of each slice included in the picture, in a PPS. Also, the slice information generator 1530 may include syntax slice_qp_delta, which indicates a difference between the syntax init_qp_minus26 indicating the picture-level initial QP and the slice-level initial QP SliceQP, in a slice header. The TU information generator 1540 may include the size information 2410 (cu_qp_delta_abs) and the sign information 2420 (cu_qp_delta_sign) of syntax cu_qp_delta, which indicates a difference between a QP at a coding unit level and the predicted QP QP_Pred, in TU information.

Figure 26:
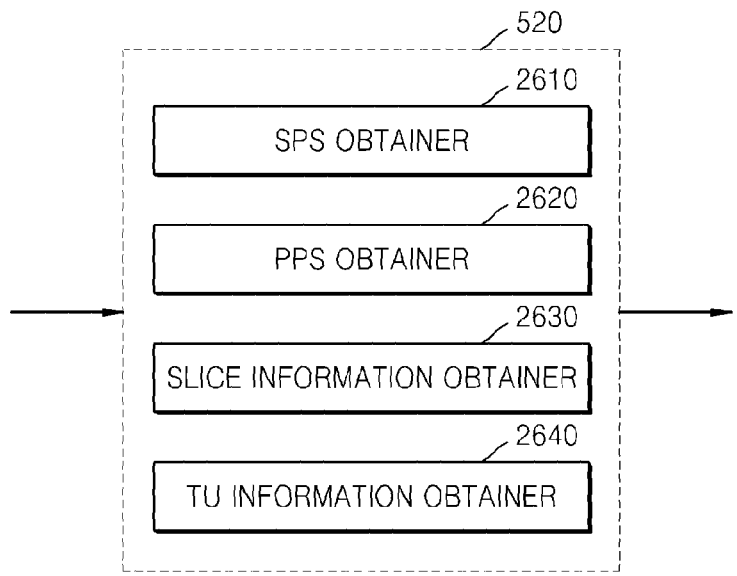
FIG. 26 is a detailed block diagram of an entropy decoder illustrated in FIG. 5, according to an exemplary embodiment.

FIG. 26 is a detailed block diagram of the entropy decoder 520 illustrated in FIG. 5, according to an exemplary embodiment.

The entropy decoder 520 arithmetically decodes syntax elements from a bitstream. In more detail, referring to FIG. 26, the entropy decoder 520 includes an SPS obtainer 2610 for obtaining an SPS including encoding information of a whole sequence, for example, a profile and a level, a PPS obtainer 2620 for obtaining a PPS including encoding information of each picture included in the sequence, a slice information obtainer 2630 for obtaining slice information including encoding information of slice segments included in a picture, and a TU information obtainer 2640 for obtaining information about TUs used in a transformation process.

The entropy decoder 520 obtains syntax for determining an initial value of a QP used to perform inverse quantization on coding units included in a slice segment. In more detail, the PPS obtainer 2620 obtains syntax init_qp_minus26 indicating a picture-level initial QP. Also, the slice information obtainer 2630 obtains syntax slice_qp_delta, which indicates a difference between the syntax init_qp_minus26 indicating the picture-level initial QP and a slice-level initial QP SliceQP, from a slice header. Besides, the entropy decoder 520 may obtain syntax (entropy_coding_sync_enabled_flag), which indicates whether parallel entropy encoding is performed on a plurality of threads included in a slice segment. If the entropy_coding_sync_enabled_flag is 1, parallel entropy decoding may be performed on a plurality of threads according to WPP as described above. If the entropy_coding_sync_enabled_flag is 0, parallel entropy decoding according to WPP may not be performed.

Figure 27:
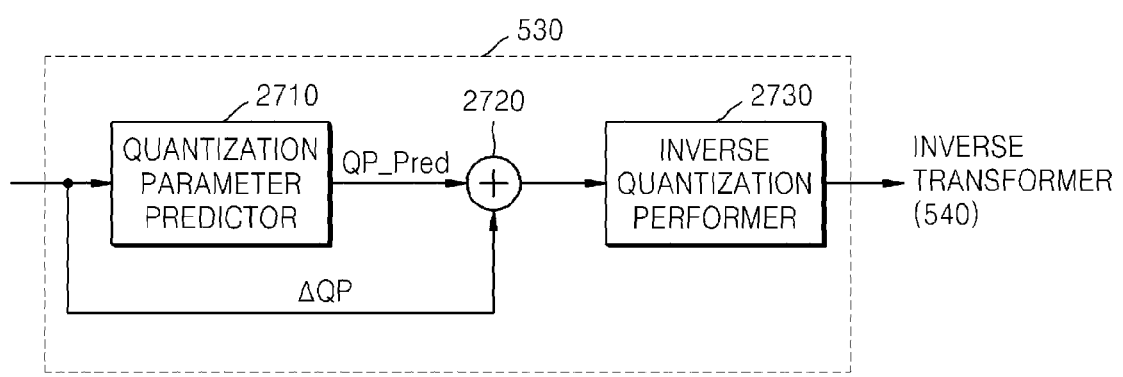
FIG. 27 is a detailed block diagram of an inverse quantizer illustrated in FIG. 5, according to an exemplary embodiment.

FIG. 27 is a detailed block diagram of the inverse quantizer 530 illustrated in FIG. 5, according to an exemplary embodiment.

Referring to FIG. 27, the inverse quantizer 530 includes a QP predictor 2710, an adder 2720, and an inverse quantization performer 2730.

Like the QP predictor 1420 illustrated in FIG. 14, the QP predictor 2710 may obtain a predicted QP QP_Pred of coding units. With respect to an initially inversely quantized coding unit (a quantization group) of a predetermined parallel-processable data unit, the QP predictor 2710 may obtain the predicted QP QP_Pred by using a slice-level initial QP SliceQP. As described above, the quantization group denotes a set of one or more coding units which share the same predicted QP QP_Pred. The quantization group may include one coding unit or a plurality of coding units. The parallel-decodable data unit may be a thread including LCUs of the same row according to WPP, or a tile obtained by partitioning a picture with respect to at least one column boundary and/or a row boundary.

Also, the QP predictor 2710 may obtain the slice-level initial QP SliceQP by using a picture-level initial QP init_qp_minus26, and syntax slice_qp_delta indicating a difference between the picture-level initial QP init_qp_minus26 and the slice-level initial QP SliceQP as shown in the following equation; SliceQP=26+init_qp_minus26+slice_qp_delta. Besides, the QP predictor 2710 obtains the predicted QP QP_Pred of a first quantization group of a parallel-processable data unit included in a current slice segment, by using the slice-level initial QP SliceQP.

The adder 2720 restores a QP by adding a QP difference ΔQP, which is a difference between the QP applied to the coding unit and the predicted QP QP_Pred, to the predicted QP QP_Pred.

The inverse quantization performer 2730 performs inverse quantization on input data by using a quantization step Q_Step determined according to the restored QP. As described above, opposite to a quantization process, the inverse quantization performer 2730 performs inverse quantization by using a value obtained by multiplying the input data by the quantization step Q_Step determined according to the QP.

Figure 28:
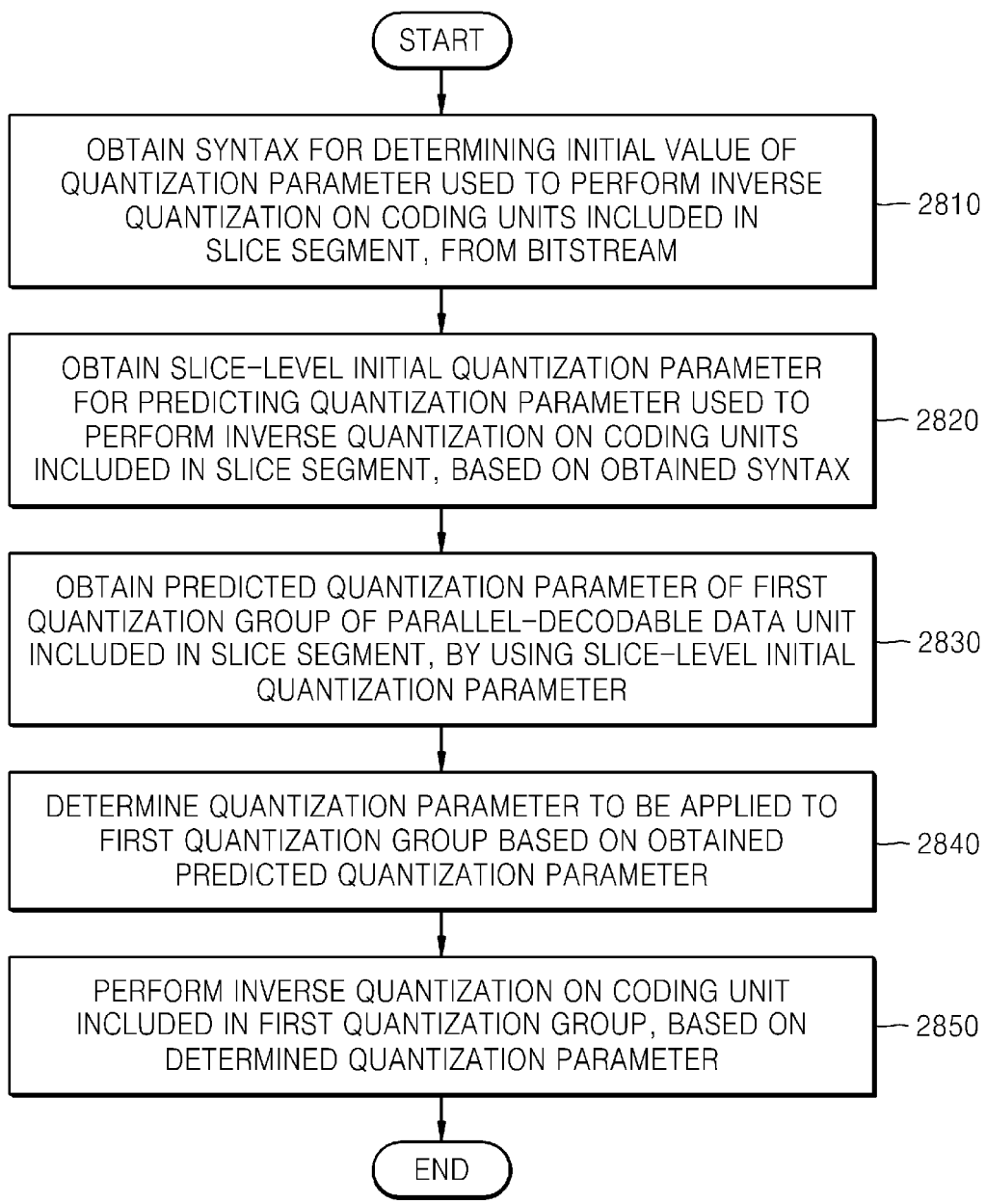
FIG. 28 is a flowchart of a video decoding method according to an exemplary embodiment.

FIG. 28 is a flowchart of a video decoding method according to an exemplary embodiment.

Referring to FIG. 28, in operation 2810, the entropy decoder 520 obtains syntax for determining an initial value of a QP used to perform inverse quantization on a first quantization group of a parallel-processable data unit included in a slice segment, from a bitstream. As described above, the PPS obtainer 2620 of the entropy decoder 520 obtains syntax init_qp_minus26 indicating a picture-level initial QP, and the slice information obtainer 2630 obtains syntax slice_qp_delta, which indicates a difference between the syntax init_qp_minus26 indicating the picture-level initial QP and a slice-level initial QP SliceQP, from a slice header.

In operation 2820, the QP predictor 2710 obtains the slice-level initial QP SliceQP for predicting a QP used to perform inverse quantization on coding units included in a slice segment, based on the obtained syntax. As described above, the QP predictor 2710 may obtain the slice-level initial QP SliceQP by using the picture-level initial QP init_qp_minus26, and the syntax slice_qp_delta indicating a difference between the picture-level initial QP init_qp_minus26 and the slice-level initial QP SliceQP as shown in the following equation; SliceQP=26+init_qp_minus26+slice_qp_delta.

In operation 2830, the QP predictor 2710 obtains a predicted QP QP_Pred of the first quantization group of the parallel-processable data unit included in the slice segment, by using the slice-level initial QP SliceQP.

In operation 2840, the adder 2720 determines a QP by adding a QP difference ΔQP, which is a difference between the QP applied to the coding unit and the predicted QP QP_Pred, to the predicted QP QP_Pred.

In operation 2850, the inverse quantization performer 2730 obtains a quantization step Q_Step based on the determined QP, and performs inverse quantization on a coding unit included in the first quantization group, by using the quantization step Q_Step.

The exemplary embodiments can be written as computer programs and can be implemented in general-use digital computers that execute the programs using a computer-readable recording medium. Examples of the computer-readable recording medium include magnetic storage media (e.g., ROM, floppy disks, hard disks, etc.) and optical recording media (e.g., CD-ROMs or DVDs).

While the exemplary embodiments have been particularly shown and described, it will be understood by one of ordinary skill in the art that various changes in form and details may be made therein without departing from the spirit and scope of the present application as defined by the following claims. The exemplary embodiments should be considered in a descriptive sense only and not for purposes of limitation. Therefore, the scope of the present application is defined not by the detailed description of the invention but by the following claims, and all differences within the scope will be construed as being included within the present application.

The invention claimed is:

1. A video decoding apparatus comprising:
a processor configured to obtain a quantization parameter of a slice, generate a predicted quantization parameter of a current quantization group using the quantization parameter of the slice, generate a predicted quantization parameter of a next quantization group using the quantization parameter of the slice, and perform an inverse quantization on the current quantization group and the next quantization group,
wherein the current quantization group is a first quantization group in a current row included in the slice,
the next quantization group is a first quantization group in a next row included in the slice, and
each of the current row and the next row comprises a plurality of largest coding units, and
wherein a predicted quantization parameter of a quantization group in the current row which is not the current quantization group, is generated using a quantization parameter of a neighboring coding unit of the quantization group in the current row, and
wherein a predicted quantization parameter of a quantization group in the next row which is not the next quantization group, is generated using a quantization parameter of a neighboring coding unit of the quantization group in the next row.

2. The video decoding apparatus of claim 1,
wherein the current quantization group is a set of at least one of coding units sharing the predicted quantization parameter of the current quantization group.

* * * * *